United States Patent
Kanamoto

(10) Patent No.: US 9,658,812 B2
(45) Date of Patent: *May 23, 2017

(54) PRINTING APPARATUS AND CONTROL METHOD OF PRINTING APPARATUS

(71) Applicant: CANON KABUSHIKI KAISHA, Tokyo (JP)

(72) Inventor: Yoshiji Kanamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/716,446

(22) Filed: May 19, 2015

(65) Prior Publication Data

US 2015/0254040 A1 Sep. 10, 2015

Related U.S. Application Data

(63) Continuation of application No. 13/915,550, filed on Jun. 11, 2013, now Pat. No. 9,073,726.

(30) Foreign Application Priority Data

Jun. 21, 2012 (JP) ................................. 2012-139822

(51) Int. Cl.
*B65H 7/20* (2006.01)
*G06F 3/12* (2006.01)
(Continued)

(52) U.S. Cl.
CPC ............. *G06F 3/1264* (2013.01); *B65H 7/20* (2013.01); *B65H 31/24* (2013.01); *B65H 33/08* (2013.01);
(Continued)

(58) Field of Classification Search
CPC B65H 33/08; B65H 33/10; B65H 2301/4219; B65H 2408/11; B65H 2511/415
(Continued)

(56) References Cited

U.S. PATENT DOCUMENTS 5,316,279 A 5/1994 Corona
5,848,346 A 12/1998 Takashiro
(Continued)

FOREIGN PATENT DOCUMENTS

CN 1911670 2/2007
CN 101998928 3/2011
(Continued)

OTHER PUBLICATIONS

Chinese Office Action issued Mar. 25, 2015 during prosecution of related Chinese application No. 20130247386.1 (Whole English-language translation included).
(Continued)

*Primary Examiner* — Jeremy R Severson
(74) *Attorney, Agent, or Firm* — Fitzpatrick, Cella, Harper & Scinto

(57) ABSTRACT

By adding a distinction for every sheet bundle of a same delivery destination and ejecting the sheet bundle, a sorting burden on the user is reduced. According to a control method of a printing apparatus, a job including predetermined information is received, an image is printed to a sheet by executing the received job, and on the basis of the predetermined information included in the received job, the sheet which is printed by executing the job is ejected to a position different from that of a sheet ejected before the sheet.

10 Claims, 23 Drawing Sheets

(51) Int. Cl.
    *B65H 33/08*     (2006.01)
    *B65H 33/10*     (2006.01)
    *B65H 31/24*     (2006.01)
    *B65H 43/00*     (2006.01)
    *G06K 15/00*     (2006.01)

(52) U.S. Cl.
    CPC ............ *B65H 33/10* (2013.01); *B65H 43/00* (2013.01); *G06F 3/1291* (2013.01); *G06K 15/403* (2013.01); *B65H 2301/4213* (2013.01); *B65H 2301/4219* (2013.01); *B65H 2408/11* (2013.01); *B65H 2511/415* (2013.01); *B65H 2801/27* (2013.01); *G03G 2215/00894* (2013.01)

(58) Field of Classification Search
    USPC ............... 271/298; 270/52.03; 399/403, 404; 7/298
    See application file for complete search history.

(56) References Cited

U.S. PATENT DOCUMENTS

| | | | |
|---|---|---|---|
| 5,898,592 | A | 4/1999 | Salgado |
| 7,690,638 | B2 | 4/2010 | Kikuchi |
| 9,073,726 | B2 * | 7/2015 | Kanamoto ............... B65H 7/20 |
| 2009/0243198 | A1 | 10/2009 | Konishi |
| 2009/0268244 | A1 | 10/2009 | Ataka |
| 2011/0063682 | A1 | 3/2011 | Kanamoto |

FOREIGN PATENT DOCUMENTS

| | | |
|---|---|---|
| CN | 102023553 | 4/2011 |
| CN | 102190199 | 9/2011 |
| JP | 2000-86079 | 3/2000 |
| JP | 2001-180084 | 7/2001 |
| JP | 2005-149154 | 6/2005 |
| JP | 2006-92405 | 4/2006 |
| JP | 2008-150204 | 7/2008 |

OTHER PUBLICATIONS

European Office Action dated Jul. 28, 2014 issued during prosecution of related European application No. 13172653.1-1705.
European Search Report dated Oct. 9, 2013, issued during prosecution of related European application No. 13172653.1.
Korean Office Action issued Aug. 17, 2015 during prosecution of related Korean application No. 10-2013-0070760.
Japanese Office Action issued Jun. 7, 2016 during prosecution of related Japanese application No. 2012-139822.

* cited by examiner

| BOOT LOADER | 501 |
| OPERATING SYSTEM | 502 |
| DATA TRANSMISSION/RECEPTION PROGRAM | 503 |
| JDF FUNCTION PROGRAM | 504 |
| COPY FUNCTION PROGRAM | 505 |
| SCAN FUNCTION PROGRAM | 506 |
| PDL PRINT FUNCTION PROGRAM | 507 |
| BOX FUNCTION PROGRAM | 508 |
| UI CONTROL PROGRAM | 509 |
| SHEET MANAGEMENT PROGRAM | 510 |
| OTHER CONTROL PROGRAMS | 511 |
| FREE SPACE | 512 |

FIG. 6

| BOOT LOADER | 601 |
| OPERATING SYSTEM | 602 |
| DEVICE DRIVER | 603 |
| PRINT APPLICATION PROGRAM | 604 |
| NETWORK CONTROL PROGRAM | 605 |
| OTHER PROGRAMS | 607 |

FIG. 8

| JOB NO. | JOB OWNER | NUMBER OF PAGES | NUMBER OF COPIES | DELIVERY DESTINATION | SORT |
|---|---|---|---|---|---|
| 0001 D | Operator-X | 21 | 1 | BRANCH OFFICE A | |
| 0002 E | Operator-A | 40 | 1 | BRANCH OFFICE A | |
| 0003 I | Operator-A | 15 | 1 | BRANCH OFFICE C | |
| 0004 G | Operator-B | 30 | 1 | BRANCH OFFICE B | |
| 0005 F | Operator-C | 73 | 1 | BRANCH OFFICE A | |
| 0006 J | Operator-P | 121 | 1 | BRANCH OFFICE C | |
| 0007 K | Operator-R | 50 | 1 | BRANCH OFFICE C | |
| 0008 H | Operator-X | 32 | 1 | BRANCH OFFICE B | |

APPLICATION SOFTWARE
FILE  EDIT  TOOL  HELP

CHANGE SETTING
RETRIEVE — 802
SORT IN ORDER OF DELIVERY DESTINATION — 803
ADD DATA — 805

TOTAL NUMBER OF DOCUMENTS: 8

| JOB NO. | FILE NAME | JOB OWNER | NUMBER OF PAGES | NUMBER OF COPIES | DELIVERY DESTINATION | SORT |
|---|---|---|---|---|---|---|
| 0001 | D | Operator-X | 21 | 1 | BRANCH OFFICE A | 901 |
| 0002 | E | Operator-A | 40 | 1 | BRANCH OFFICE A | |
| 0005 | F | Operator-C | 73 | 1 | BRANCH OFFICE A | |
| 0004 | G | Operator-B | 30 | 1 | BRANCH OFFICE B | |
| 0008 | H | Operator-X | 32 | 1 | BRANCH OFFICE B | |
| 0003 | I | Operator-A | 15 | 1 | BRANCH OFFICE C | |
| 0006 | J | Operator-P | 121 | 1 | BRANCH OFFICE C | |
| 0007 | K | Operator-R | 50 | 1 | BRANCH OFFICE C | |

TOTAL NUMBER OF DOCUMENTS: 8

FIG. 11

| JOB NO. | FILE NAME | JOB OWNER | NUMBER OF PAGES | NUMBER OF COPIES | DELIVERY DESTINATION | SORT |
|---|---|---|---|---|---|---|
| 0001 | D | Operator-X | 21 | 1 | BRANCH OFFICE A | |
| 0002 | E | Operator-A | 40 | 1 | BRANCH OFFICE A | |
| 0005 | F | Operator-C | 73 | 1 | BRANCH OFFICE A | |
| 0004 | G | Operator-B | 30 | 1 | BRANCH OFFICE B | |
| 0008 | H | Operator-X | 32 | 1 | BRANCH OFFICE B | |
| 0003 | I | Operator-A | 15 | 1 | BRANCH OFFICE C | |
| 0006 | J | Operator-P | 121 | 1 | BRANCH OFFICE C | |
| 0007 | K | Operator-R | 50 | 1 | BRANCH OFFICE C | |
| 0009 | L | Operator-B | 23 | 1 | BRANCH OFFICE C | |

1101

1102 — TOTAL NUMBER OF DOCUMENTS: 9

FIG. 12

| JOB NO | FILE NAME | JOB OWNER | NUMBER OF PAGES | NUMBER OF COPIES | DELIVERY DESTINATION | SORT |
|---|---|---|---|---|---|---|
| 0001 | D | Operator-X | 21 | 1 | BRANCH OFFICE A | |
| 0002 | E | Operator-A | 40 | 1 | BRANCH OFFICE A | |
| 0005 | F | Operator-C | 73 | 1 | BRANCH OFFICE A | ⟩ 1201 |
| 0004 | G | Operator-B | 30 | 1 | BRANCH OFFICE B | |
| 0008 | H | Operator-X | 32 | 1 | BRANCH OFFICE B | ⟩ 1202 |
| 0003 | I | Operator-A | 15 | 1 | BRANCH OFFICE C | |
| 0006 | J | Operator-P | 121 | 1 | BRANCH OFFICE C | |
| 0007 | K | Operator-R | 50 | 1 | BRANCH OFFICE C | |
| 0009 | L | Operator-B | 23 | 1 | BRANCH OFFICE C | |

TOTAL NUMBER OF DOCUMENTS: 9

FIG. 13

APPLICATION SOFTWARE  ? ×

FILE | EDIT | TOOL | HELP

SAVE
PRINT — 1302
PROPERTY
END

| NAME | JOB OWNER | NUMBER OF PAGES | NUMBER OF COPIES | DELIVERY DESTINATION | SORT |
|---|---|---|---|---|---|
| | Operator-X | 21 | 1 | BRANCH OFFICE A | |
| G | Operator-A | 40 | 1 | BRANCH OFFICE A | 1201 |
| H | Operator-C | 73 | 1 | BRANCH OFFICE A | 1202 |
| 0004 | Operator-B | 30 | 1 | BRANCH OFFICE B | |
| 0008 | Operator-X | 32 | 1 | BRANCH OFFICE B | |
| 0003 I | Operator-A | 15 | 1 | BRANCH OFFICE C | |
| 0006 J | Operator-P | 121 | 1 | BRANCH OFFICE C | |
| 0007 K | Operator-R | 50 | 1 | BRANCH OFFICE C | |
| 0009 L | Operator-B | 23 | 1 | BRANCH OFFICE C | |

TOTAL NUMBER OF DOCUMENTS: 9

| JOB NO. | FILE NAME | JOB OWNER | NUMBER OF PAGES | NUMBER OF COPIES | DELIVERY DESTINATION |
|---|---|---|---|---|---|
| 0001 | D | Operator-X | 21 | 1 | BRANCH OFFICE A |
| 0007 | K | Operator-R | 50 | 1 | BRANCH OFFICE C |
| 0005 | F | Operator-C | 73 | 1 | BRANCH OFFICE A |
| 0008 | H | Operator-X | 32 | 1 | BRANCH OFFICE B |
| 0002 | E | Operator-A | 40 | 1 | BRANCH OFFICE A |
| 0003 | I | Operator-A | 15 | 1 | BRANCH OFFICE C |
| 0006 | J | Operator-P | 121 | 1 | BRANCH OFFICE C |
| 0004 | G | Operator-B | 30 | 1 | BRANCH OFFICE B |
| 0009 | L | Operator-B | 23 | 1 | BRANCH OFFICE C |

TOTAL NUMBER OF DOCUMENTS: 9

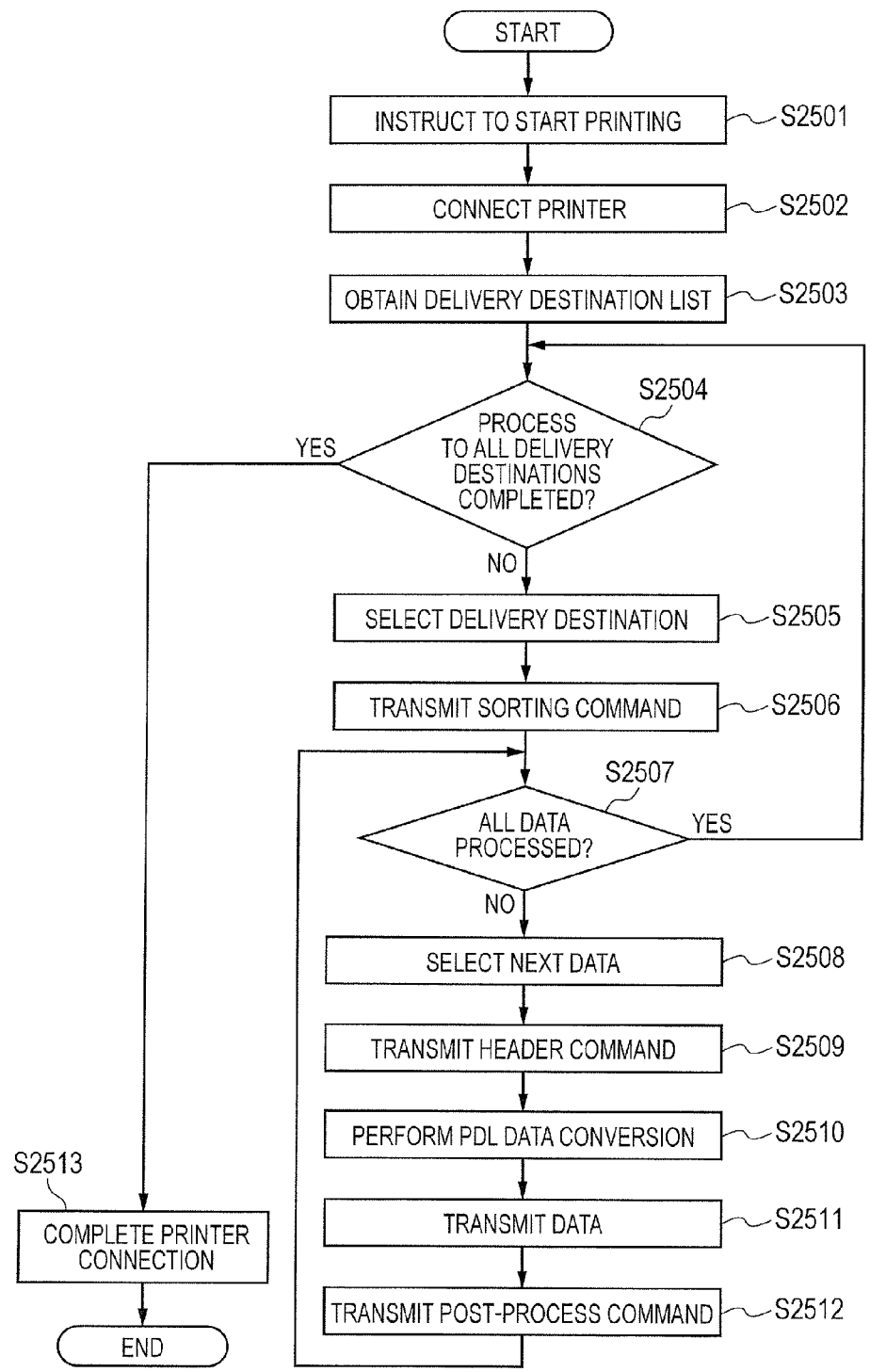

PRINTING APPARATUS AND CONTROL METHOD OF PRINTING APPARATUS

This application is a continuation of U.S. application Ser. No. 13/915,550, filed on Jun. 11, 2015, which claims priority to Japanese Application No. 2012-139822, filed on Jun. 21, 2012, the contents of each of which are incorporated by reference.

BACKGROUND OF THE INVENTION

Field of the Invention

The present invention relates to a printing apparatus for performing processing of sheets and to a method of controlling the printing apparatus.

Description of the Related Art

There is a requirement in known printing apparatus for a plurality of different output matters to be sequentially formed and handled as a single bundle.

For example, a case in which a head office and a plurality of branch offices exist and in which printing is handled in the head office, a document for each branch office is formed and those documents are delivered on a branch office unit basis is now considered. In such a case, the contents of the document are specialized for every branch office.

More specifically speaking, for example, the following cases are now considered: a case where a head office and branch offices A, B, and C exist; and a case where there are documents D, E, F, G, H, I, J, K, and L and the aforementioned documents are delivered to individual branch offices, as follows.

Branch office A: D, E, F
Branch office B: G, H
Branch office C: I, J, K, L

In the print center provided in the head office, the nine kinds of documents D, E, F, G, H, I, J, K, and L in total which are delivered for every branch office mentioned above are printed by a digital printer disposed in the print center. However, generally, the documents are continuously output for every branch office, for efficiency reasons, at the time of sorting delivery destinations D, E, F, G, H, I, J, K, and L.

That is, for example, the documents D, E, and F whose delivery destination is the branch office A are continuously processed. When the process as mentioned above is not executed, for example, if the documents were output in order such as D, E, G, H, and F or the like, the documents whose delivery destination is the branch office B exist mixedly in the documents for delivery to the branch office A. In such a case, before delivery, the user has to execute such a process that the print-target data G and H for delivery to the branch office B are removed from the output matters.

Such an operation is not only troublesome but there is also a risk of inviting a human error or the like and it is extremely inefficient. The necessity that the documents for each delivery destination are continuously output is based on the reasons as mentioned above. Japanese Patent Application Laid-Open No. 2008-150204 discloses such a print system that one document is received as one job and output matters are sorted every job and ejected.

An object to continuously form different kinds of output matters to a plurality of delivery destinations by using the digital printer and a convenience which is thus obtained are as disclosed in the related art. However, in the case as mentioned above, when considering efficiently achieving the object, a still further problem exists when convenience is improved.

The above example will be further specifically described.

It is now assumed that documents D, E, and F were output to the branch office A serving as a delivery destination, documents G and H were output to the branch office B, and documents I, J, K, and L were output to the branch office C in this order by the digital printer, respectively. The output matters are stacked in an ejecting unit of the digital printer in order of D, E, F, G, H, I, J, K, and L.

In this state, since the documents have been continuously output for every delivery destination, such a case that the output matters for another delivery destination exist mixedly in the printed matters for every delivery destination as mentioned in the related art does not occur.

However, if the nine documents D to L were uniformly stacked in the ejecting unit, when the stacked output matters are sorted on a delivery destination unit basis, the user cannot easily recognize a boundary portion between the documents.

Therefore, the user has to execute such a troublesome operation that he has to carefully search for a boundary between the printed matters and a boundary portion between the delivery destinations while confirming the contents of the printed matters. In other words, even in the case where the printed matters to another delivery destination do not exist mixedly in the printed matters for each delivery destination, the operation to uniformly sort a bundle of printed matters which were uniformly stacked into the printed matters for each delivery destination is still accompanied with the difficult operation.

The digital printer has such a function that each time the output matters of one job are ejected, the output matters are shifted and ejected and such a sorting function that each time the output matters of one copy are ejected, the output matters are shifted and ejected as disclosed in Japanese Patent Application Laid-Open No. 2008-150204.

However, even in the case where the documents D, E, F, G, H, I, J, K, and L to each delivery destination as mentioned above were output by using the sorting function of the digital printer, such a problem cannot be solved. All of the documents can be ejected in the shifted state by using the sorting function. In such a case, such a fear that the boundary portion between the documents is erroneously sorted can be reduced. However, it is still difficult to discriminate the delivery destinations. That is, although the documents have to be sorted as follows in accordance with the inherent object.

Branch office A: D, E, F
Branch office B: G, H
Branch office C: I, J, K, L

Since a distinction of a branch office unit is unclear, there is a possibility that the documents are erroneously sorted as follows.

Branch office A: D, E
Branch office B: F, G, H, I
Branch office C: J, K, L

The foregoing error is merely an example. There is also another possibility that due to a boundary between the delivery destinations being obscure in the bundle of stacked output matters, the documents to a certain branch office are erroneously sorted as an output matter bundle to a different branch office.

In such a situation, in order to correctly execute the sorting process for every delivery destination, the operator who executes the sorting process has to carefully execute the operation after he accurately recognized which documents should be delivered to which delivery destination. However, such an operation is difficult and it is presumed that a human error occurs easily.

Although the case where the printed matters are sorted from the head office to each branch office has been described as a specific example, many other similar cases exist. That is, as another example, there is a case where in the print center, individuals are made to correspond to a plurality of delivery destinations. The erroneous delivery of a printed matter including personal information should be avoided as much as possible.

SUMMARY OF THE INVENTION

To accomplish the above object, according to an aspect of the invention, there is provided a printing apparatus comprising: a receiving unit configured to receive a job including predetermined information; a printing unit configured to print an image onto a sheet by executing the job received by the receiving unit; and a control unit configured to control in such a manner that on the basis of the predetermined information included in the job received by the receiving unit, that the print unit is adapted to control the ejection of the sheet which is printed by executing the job and or sheets ejected before the printed sheet, including where appropriate a sheet showing a distinction, based on said predetermined information. For example, the sheet which is printed by executing the job is ejected to a position different from that of a sheet ejected before the sheet. Alternatively, a sheet showing a distinction is inserted between the sheet which is printed by executing the job and a sheet ejected before the sheet.

Further features of the present invention will become apparent from the following description of embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 5 is a block diagram illustrating a construction of modules stored in a ROM illustrated in FIG. 2.

FIG. 6 is a diagram illustrating a construction of the modules which are executed by the computer illustrated in FIG. 1.

FIG. 8 is a diagram illustrating an example of a user interface which is displayed on the CRT illustrated in FIG. 3.

FIG. 9 is a diagram illustrating an example of a user interface which is displayed on the CRT illustrated in FIG. 3.

FIG. 11 is a diagram illustrating an example of a user interface which is displayed on the CRT illustrated in FIG. 3.

FIG. 12 is a diagram illustrating an example of a user interface which is displayed on the CRT illustrated in FIG. 3.

FIG. 13 is a diagram illustrating an example of a user interface which is displayed on the CRT illustrated in FIG. 3.

FIG. 23 is a diagram illustrating an example of a user interface which is displayed on the CRT illustrated in FIG. 3.

FIG. 25 is a flowchart for describing the data processing method in the information processing apparatus.

DESCRIPTION OF THE EMBODIMENTS

Preferred embodiments of the present invention will now be described in detail in accordance with the accompanying drawings.

<Description of System Construction>

First Embodiment

Figure 1:
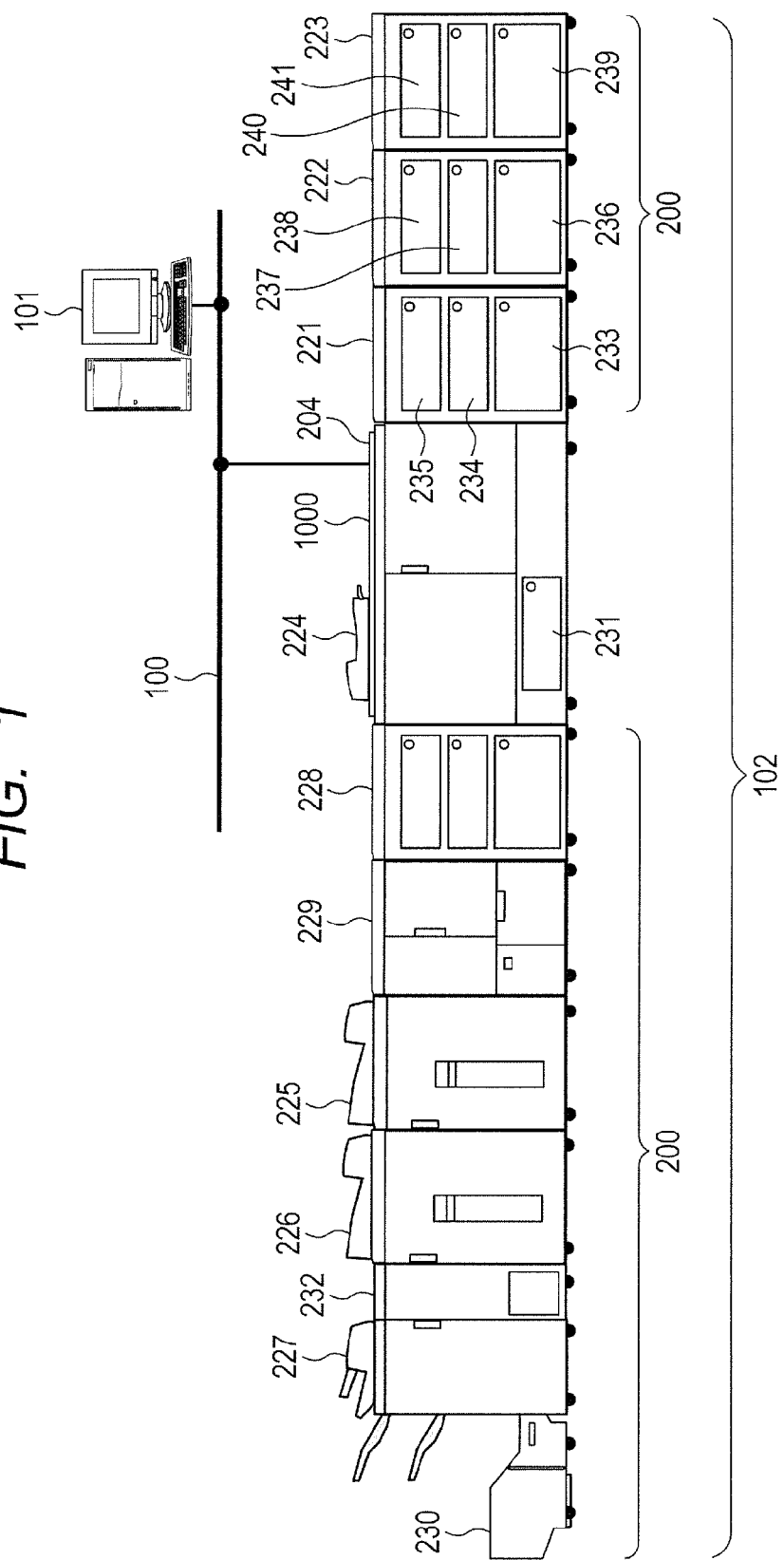
FIG. 1 is a diagram for describing a construction of a print system to which a printing apparatus is applied.

FIG. 1 is a diagram for describing a construction of a print system to which a printing apparatus showing the embodiment is applied. This diagram relates to an example of a digital printer for use in a POD (Print On Demand) market and a system using the digital printer. Specifically speaking, an example of the system in which a digital printer 102 and a computer 101 are connected through a network 100 is illustrated.

In FIG. 1, the digital printer 102 is constructed in such a manner that a plurality of apparatuses having different roles are mutually connected and a complicated sheet process can be executed. Each portion constructing the printing apparatus will be described hereinbelow.

A digital printing unit 1000 is an apparatus constructed in such a manner that decompressed image data is transferred onto a (sheet) stacked in a sheet feeding unit, which will be described hereinafter, and an image is formed onto the sheet by using toner. General construction and operation principle of a printer unit will be described hereinbelow.

A rotary polygon mirror (polygon mirror or the like) allows a light beam such as a laser beam modulated in accordance with the image data to enter and irradiates the light as reflection scanning light onto a photosensitive drum through a reflecting mirror. A latent image formed on the photosensitive drum by the laser beam is developed by toner and the toner image is transferred onto a sheet material, that is, the sheet adhered on the transfer drum. Such a series of image forming processes are sequentially executed to the toner of yellow (Y), magenta (M), cyan (C), and black (K), thereby forming a full color image. It is also possible to construct in such a manner that in addition to the toner of four colors, toner called a spot color, transparent toner, or the like can be transferred.

The sheet material on the transfer drum on which the full color image has been formed is conveyed to a fixing device. The fixing device is constructed by a combination of rollers and a belt and has a heat source such as a halogen heater or the like therein. In the fixing device, the toner on the sheet material on which the toner image has been transferred is dissolved and fixed by a heat and a pressure.

A scanner 224 and an operation unit 204 are provided for the digital printing unit 1000 of the digital printer 102 according to the embodiment. The operation unit 204 is arranged on the upper surface of the digital printing unit 1000. The operation unit 204 provides various kinds of interfaces in the case where the operator executes various kinds of settings, operations, and the like of the digital printing unit 1000 showing the embodiment.

The digital printer 102 is constructed so as to be inline-connected in such a form that in addition to the digital printing unit 1000, various kinds of associated apparatuses can be attached.

Document feeders 221, 222, and 223 of a large capacity are sheet feeding apparatuses which are constructed so that then can be attached/detached to/from a main body. As illustrated in the diagram, a plurality of document feeders can be attached. The document feeders have a plurality of sheet feeding cassettes (233, 234, 235), (236, 237, 238), and (239, 240, 241), respectively. Since the plurality of document feeders of the large capacity can be attached as mentioned above, the digital printer 102 is constructed in such a manner that a convenience during the execution of a print process of a larger capacity can be improved.

Stackers 225 and 226 of a large capacity are apparatuses each for stacking therein a large quantity of printed sheets which were ejected. In the printing apparatus having the document feeders 221, 222, and 223, since the formed output matters also inevitably have a large capacity, such document feeders are necessary. According to the construction of the embodiment illustrated in FIG. 1, a construction in which the two stackers 225 and 226 of the large capacity in total are connected is illustrated.

As for the stackers 225 and 226 of the large capacity, a process for opening an outer cover adapted to take out the sheets stacked on an internal stacking tray can be instructed by an explicit operation of the operator. At the same time, they are constructed in such a manner that the outer cover can be also automatically opened by an instruction from the digital printing unit 1000. In the case where the process for opening the outer cover is executed, they are controlled in such a manner that a process for stacking the printed sheets onto the stackers 225 and 226 of the large capacity is preliminarily stopped.

Further, the stackers 225 and 226 of the large capacity have such a function that when the printed sheets are stacked, a stacking position regarding an arbitrary sheet is shifted. Thus, a sorting process which is executed when the operator has taken out the large capacity of stacked sheets on a unit basis of a predetermined bundle later can be made easy.

A folding apparatus 232 is an apparatus for executing various kinds of complicated folding processes such as saddle-folding, Z-folding, three-folding, four-folding, and the like.

A saddle stitch book binder 227 enables the following processes to be executed to the sheets from the digital printing unit 1000: that is, a stapling process; a saddle stitch, a saddle folding, and a punching process which are executed when booklet output matters are formed; a shift sheet ejecting process for shifting a stacking position with respect to an arbitrary sheet; and the like. In the digital printer 102 shown in the embodiment, when saddle-stitched booklet output matters are formed by using the saddle stitch book binder 227, a folding function of the folding apparatus 232 is not used but the output matters are formed by using a combination of the saddle folding function and the saddle stitch function provided for the saddle stitch book binder. A cutting apparatus 230 is an apparatus for conveying the booklet output matters which were saddle-stitched in the saddle stitch book binder 227, cutting the portions corresponding to edge portions, and forming the edges on a plane.

An inserter 228 is a unit having a function for inserting the sheets held in the inserter at proper timing into the sheets which are sent from the printer unit on the basis of the settings. By the inserter 228, the sheets which do not need the printing can be inserted among the printed sheets. A plurality of inserters 228 are equipped so as to also endure a print process of a large capacity in a manner similar to the document feeders 221, 222, and 223 of the large capacity.

A case book binder 229 is an apparatus for forming case booklet output matters by pasting a cover to a bundle of sheets which were printed by the digital printing unit 1000 or inserted by the inserter 228. A top paste book binding process corresponding to a working process for performing a paste book binding without adhering a cover can be also executed by the case book binder 229. Since the case book binder 229 is a sheet processing apparatus which can execute at least a case book binding process, it is called "case book binder".

The digital printer 102 can be divided into three main portions by setting the digital printing unit 1000 as a boundary. An apparatus which is arranged on the right side of the digital printing unit 1000 in FIG. 1 is called "sheet feeding system apparatus". A main role of the sheet feeding system apparatus is to continuously supply the sheets stacked in the apparatus to the digital printing unit 1000 at proper timing.

A detection of a residual amount of sheets stacked in the apparatus and the like are also performed. A sheet feeding cassette 231 also exists in the digital printing unit 1000 and can functionally execute a process similar to that of the sheet feeding system apparatus. It is assumed that the sheet feeding cassette 231 equipped for the digital printing unit 1000 itself is also called "sheet feeding system apparatus".

An apparatus which is arranged on the left side of the digital printing unit 1000 in FIG. 1 is called "sheet post-processing apparatus". The sheet post-processing apparatus executes various kinds of working processes to the sheets to which the print process has been completed and performs a process for collecting those sheets or the like.

The foregoing sheet feeding system apparatus and sheet post-processing apparatus are collectively called "sheet processing apparatus 200" in the following description.

The computer 101 is constructed as a general computer connected to the digital printer 102 through the network 100. In this instance, the computer 101 can execute various kinds of application programs. A print job (print-target image data and print setting) can be transmitted to the digital printer 102.

Subsequently, an internal construction (mainly, software construction) of the digital printer 102, which will be described in the embodiment, will be described.

Figure 2:
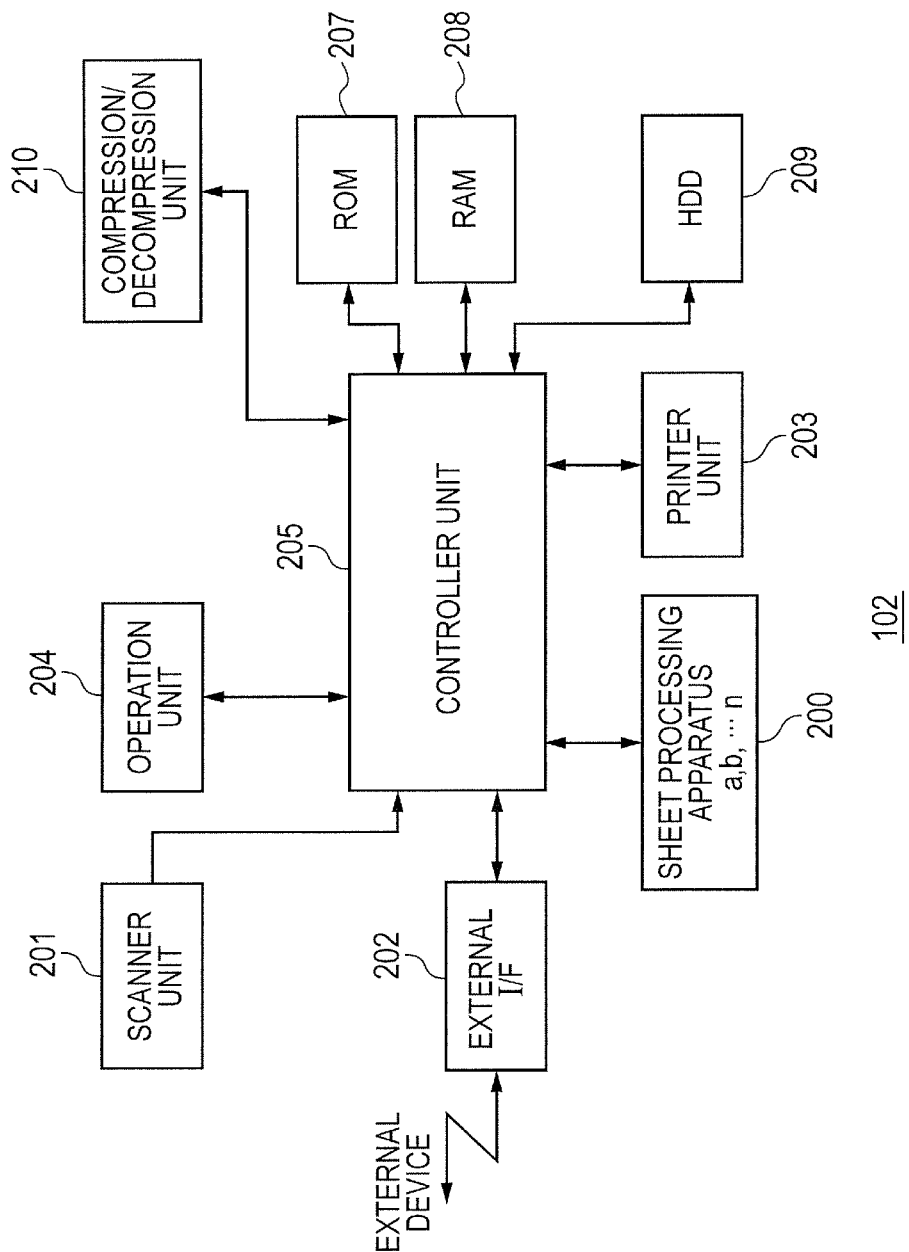
FIG. 2 is a block diagram for describing an internal construction of a digital printer illustrated in FIG. 1.

FIG. 2 is a block diagram for describing the internal construction of the digital printer 102 illustrated in FIG. 1. In this example, since the digital printer 102 is divided on a unit basis of a system block level, portions which do not always correspond to the unit of the apparatus construction illustrated in FIG. 1 exist.

In FIG. 2, in the self apparatus, the digital printer 102 has a non-volatile memory such as a hard disk 209 (hereinbelow, also called HDD) or the like which can store data of a plurality of processing-target jobs. Although an example of the digital printer 102 using the hard disk 209 has been shown in the embodiment, the storage device is not limited to the HDD 209 so long as it is a similar non-volatile storage device of a large capacity.

The digital printer 102 further has such a copy function that job data received from a scanner unit 201 equipped for the digital printer 102 itself is printed by a printer unit 203 through the HDD 209. Further, the digital printer 102 has such a print function that job data received from an external apparatus through an external I/F unit 202 corresponding to an example of a communicating unit is printed by the printer unit 203 through the HDD 209, and the like.

The digital printer 102 in the embodiment is a printing apparatus of an MPF type having such a plurality of functions (also called an image forming apparatus).

In other words, the digital printer 102 in the embodiment may be an apparatus having any construction such as printing apparatus which can print a color image or printing apparatus which can print a monochromatic image so long as it can perform various kinds of control, which will be described in the embodiment.

The digital printer 102 in the embodiment has the scanner unit 201 for reading an image of the original and processing the read image data. The digital printer 102 also has the external I/F unit 202 for transmitting and receiving the image data or the like to/from a facsimile apparatus, network-connected equipment, and an external dedicated apparatus. The digital printer 102 also has the HDD 209 which can store the image data of a plurality of print-target jobs received from the scanner unit 201 or the external I/F unit 202.

Various kinds of management information and the like which are stored, changed, and managed by the digital printer 102 according to the invention are also stored in the HDD 209.

Further, the digital printer 102 has the printer unit 203 for executing a print process of the data of the print-target jobs stored in the HDD 209 to a print medium. The digital printer 102 also has the operation unit 204 having a display unit corresponding to an example of a user interface unit.

A controller unit (also called a control unit or CPU) 205 corresponding to an example of a control unit equipped for the digital printer 102 integratedly controls processes, operations, and the like of various kinds of units equipped for the digital printer 102. Various kinds of control programs which are required in the embodiment and includes a program for executing various kinds of processes shown in flowcharts, which will be described hereinafter, have been stored in a ROM 207.

A display control program for displaying various kinds of user interface display screens (hereinbelow, called UI display screens) including UI display screens illustrated in the diagram to a display unit of the operation unit 204 has also been stored in the ROM 207.

The controller unit 205 reads out the program from the ROM 207 and executes it, thereby allowing various kinds of operations, which will be described hereinafter in the embodiment, to be executed by the digital printer 102. A program to execute the operation for interpreting PDL (page description language) code data received from the external apparatus (not shown) through the external I/F unit 202 and developing into raster image data (bitmap image data) and the like have also been stored in the ROM 207.

Similarly, a program for interpreting and processing a print job received from the external apparatus (not shown) through the external I/F unit 202 and the like have also been stored in the ROM 207. Those programs are processed by software.

The ROM 207 is constructed by a read only memory and various kinds of programs such as program of a boot sequence, font information, and the like, programs mentioned above, and the like have previously been stored in the ROM 207. Details of the various kinds of programs stored in the ROM 207 will be described hereinafter. A RAM 208 is a readable and writable memory for storing the image data sent from the scanner unit 201 and external I/F unit 202, the various kinds of programs, and setting information.

The HDD 209 is a storage device of a large capacity for storing the image data compressed by a compression/decompression unit 210. A plurality of data such as print data of the processing-target jobs and the like can be held in the HDD 209. The controller unit 205 controls in such a manner that the data of the processing-target jobs which were input through various kinds of input units such as scanner unit 201, external I/F unit 202, and the like can be printed by the printer unit 203 through the HDD 209.

The controller unit 205 also controls in such a manner that the data can be also transmitted to the external apparatus through the external I/F unit 202. Various kinds of outputting processes of the data of the processing-target jobs stored in the HDD 209 as mentioned above are controlled by the controller unit 205 so that they can be executed.

The compression/decompression unit 210 executes the compressing/decompressing operation to the image data stored in the RAM 208 and HDD 209 by an arbitrary one of various kinds of compressing methods such as JBIG, JPEG, and the like. In such a construction as mentioned above, the controller unit 205 serving as an example of the control unit provided for the print system also controls the operation of each sheet processing apparatus 200. The sheet processing apparatus 200 corresponds to the sheet feeding system apparatus and the sheet post-processing apparatus described in FIG. 1.

Figure 3:
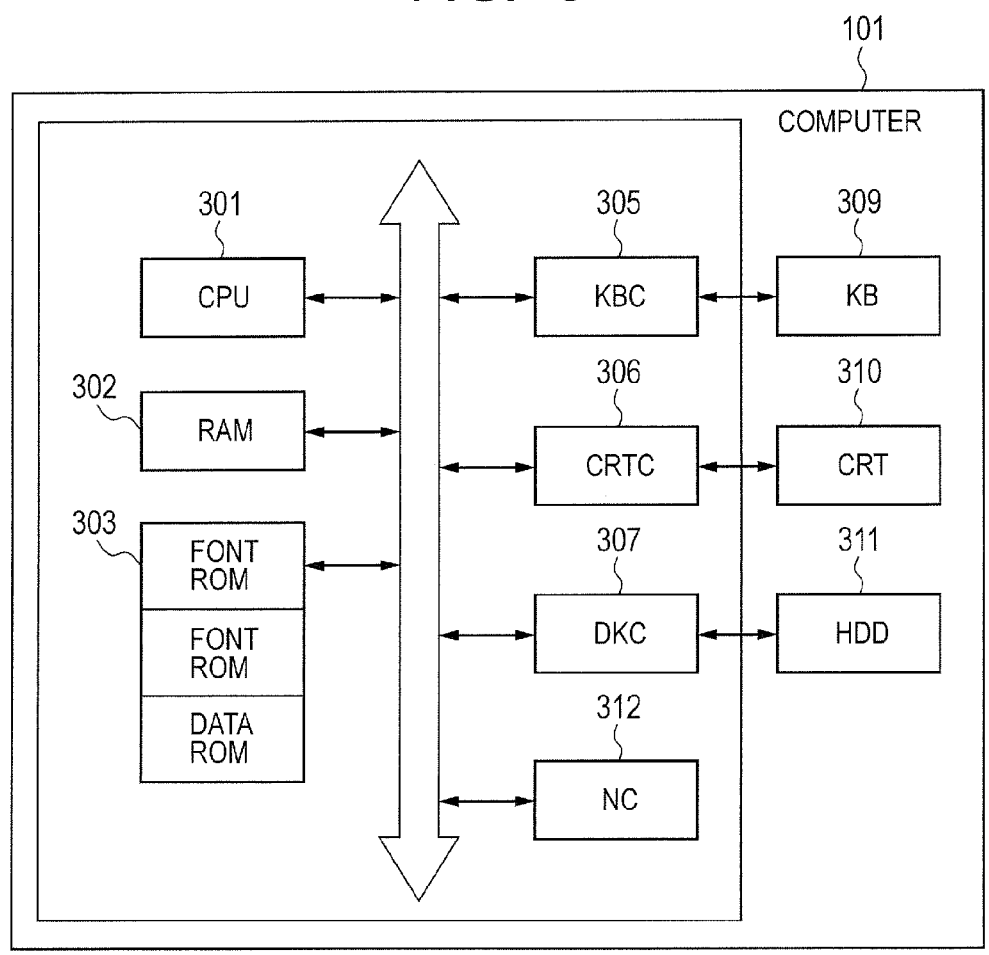
FIG. 3 is a block diagram illustrating an internal construction in a computer illustrated in FIG. 1.

FIG. 3 is a block diagram illustrating an internal construction in the computer 101 illustrated in FIG. 1.

In FIG. 3, a CPU 301 executes a program such as OS, general application, book binding application, or the like which has been stored in a program ROM in a ROM 303 or loaded from an HDD 311 into a RAM 302.

The RAM 302 functions as a main memory, a work area, or the like of the CPU 301. A keyboard controller (KBC) 305 controls a key input from a keyboard 309 or a pointing device (not shown).

A CRT controller (CRTC) 306 controls a display of a CRT display 310. A disk controller (DKC) 307 controls an access to the HDD 311, floppy (registered trade mark) disk (FD), or the like in which a boot program, various kinds of applications, font data, a user file, and the like have been stored. A PRTC controls an exchange of signals which are transmitted to/from the connected digital printing unit 1000. An NC 312 is connected to the network and executes a communication control process for controlling a communication with another equipment connected to the network.

Figure 4:
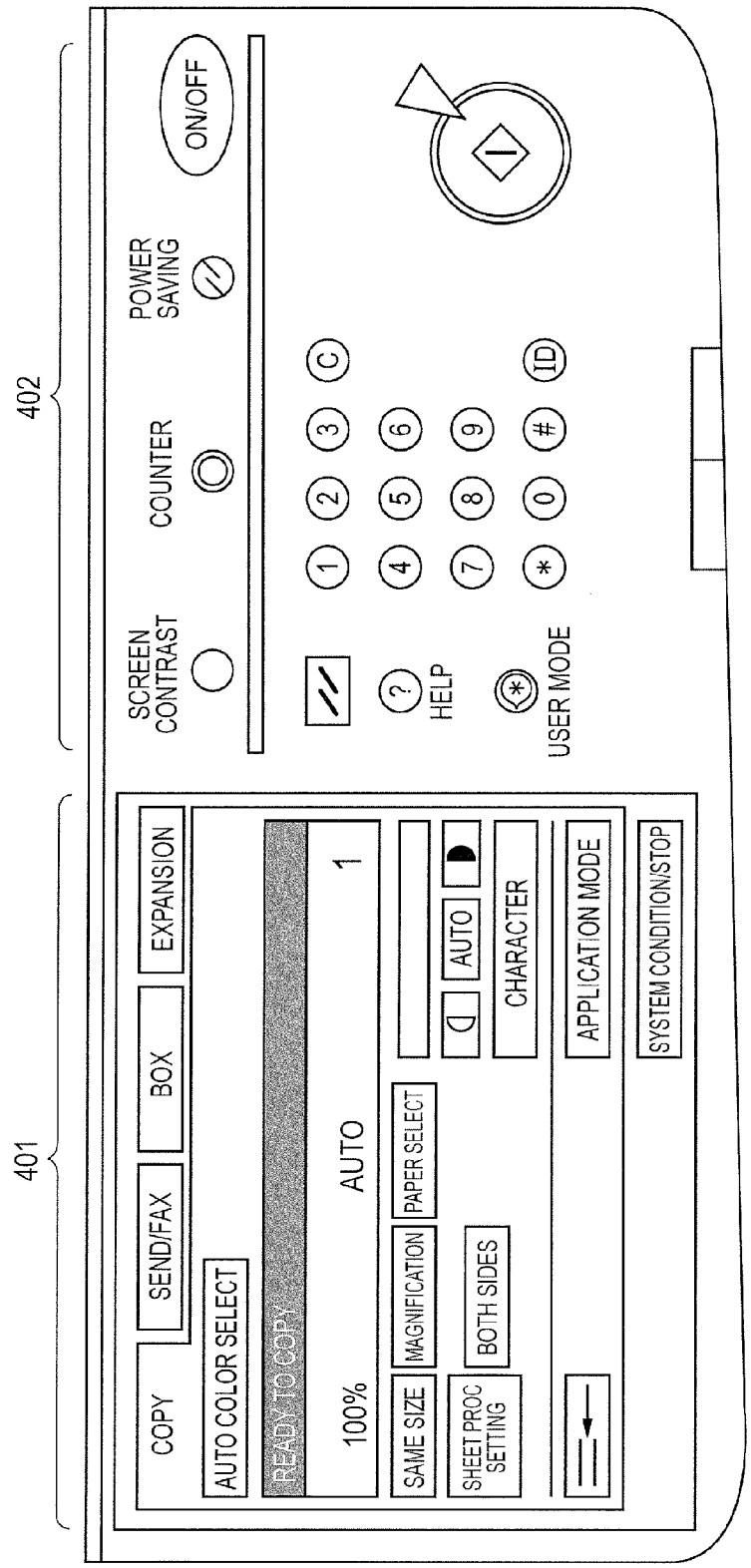
FIG. 4 is a plan view illustrating an example of an operation unit illustrated in FIG. 1.

FIG. 4 is a plan view illustrating an example of the operation unit 204 illustrated in FIG. 1.

The operation unit 204 illustrated in FIG. 4 has: a key input portion 402 which can receive the user operation that is executed by using a hardware key; and a touch panel portion 401 serving as an example of a display unit which can receive the user operation that is executed by using a software key (display key).

A display screen which is displayed on the display unit of the touch panel portion 401 in FIG. 4 is illustrated as an example of various kinds of display screens showing the operations which are executed by the controller unit 205 via the display unit. The display screen is displayed on the display unit in accordance with the operation from the user or various kinds of states of the equipment, or items which can operated therefrom change.

FIG. 5 is a block diagram for describing a construction of modules stored in the ROM 207 illustrated in FIG. 2. The diagram shows an example of various kinds of programs which are read out and executed by the controller unit 205 in the digital printer 102 and data which is used by the programs or the like. As illustrated in the diagram, a control program for realizing various kinds of functions which can be provided by the digital printer 102 has been stored in the ROM 207.

In FIG. 5, a boot loader 501 is a program which is executed just after a power source of the digital printer 102 was turned on. A program for executing various kinds of activating sequences which are necessary to activate the system is included in the boot loader 501.

An operating system 502 is a program for providing an executing environment of the various kinds of programs for realizing the functions of the digital printer 102. The operating system 502 mainly provides the functions such as resource management of the memories of the digital printer 102, that is, the ROM 207, RAM 208, hard disk 209, and the like in FIG. 2, fundamental input/output control of the various kinds of apparatuses illustrated in the diagram, and the like.

A data transmission/reception program 503 is a control program for executing a transmitting/receiving process which is executed when an input/output request of data is issued via the external I/F unit 202 in FIG. 2.

Specifically speaking, the data transmission/reception program 503 is a control program which includes a protocol stack such as TCP/IP or the like and is used to make a communication of various kinds of data which is transmitted and received to/from external equipment and the like connected via the network 100. The communicating process which is executed here corresponds to a process limited to the communicating process of a transmission/reception level of a data packet which is input/output between the digital printer 102 and the external I/F unit 202, an HTTP server, or the like. An analyzing process regarding the contents of the received data, which will be described hereinafter, is not included. The analyzing process of the data is executed by the controller unit 205, which will be described hereinafter, on the basis of the contents of the description of another program.

A JDF function program 504 is a program which is executed by the controller unit 205 in accordance with an instruction from the operation unit 204 in the case where JDF job data (print job data) has been received by the digital printer 102 through the external I/F unit 202.

In a JDF print function which is executed by the controller unit 205, the controller unit 205 sequentially instructs the operations of the apparatuses in proper order on the basis of processing order and processing conditions described in the JDF function program 504. Thus, a JDF print process is finally executed.

As such apparatuses, the sheet processing apparatus 200, printer unit 203, HDD 209, compression/decompression unit 210, RAM 208, and the like in FIG. 2 are included. Programs for executing an analyzing process of the JDF job data received through the external I/F unit 202, a discriminating process for discriminating whether or not an erroneous setting is included in the JDF as a result of the analyzing process, a setting change to solve the erroneous setting, and the like are also included.

A copy function program 505 is a program for executing a copy function which is executed by the controller unit 205 in accordance with an instruction from the operation unit 204 in the case where the user of the digital printer 102 instructed an execution of a copy function through the operation unit 204.

In the copy function which is executed by the controller unit 205, the resources in the digital printer 102 are controlled in such a manner that the controller unit 205 sequentially instructs the operations of the apparatuses in proper order on the basis of the processing order and processing conditions described in the program. Thus, control is made so that the copy process is finally executed. As such apparatuses, the scanner unit 201, printer unit 203, sheet processing apparatus 200, HDD 209, compression/decompression unit 210, RAM 208, and the like are included.

A scan function program 506 is a program for executing a scan function which is executed by the controller unit 205 in accordance with an instruction from the operation unit 204 in the case where the user of the digital printer 102 instructed an execution of the scan function through the operation unit 204. The scan function which is executed by the controller unit 205 is executed as follows.

The resources in the digital printer 102 are controlled in such a manner that, the modules such as scanner unit 201, HDD 209, compression/decompression unit 210, RAM 208, and the like are controlled by the controller unit 205 on the basis of the processing order and processing conditions described in the program. At this time, control is made so that the scan process is finally executed by sequentially instructing the operations of those apparatuses in proper order.

A PDL print function program 507 is a program which is executed by the controller unit 205 in accordance with an instruction from the operation unit 204 in the case where the PDL job data (print job data) was received by the digital printer 102 through the external I/F unit 202. In a PDL print function which is executed by the controller unit 205, the controller unit 205 sequentially instructs the operations of the apparatuses in proper order on the basis of the processing order and processing conditions described in the program. Thus, control is made so that the PDL print process is finally executed. As such apparatuses, the sheet processing apparatus 200, printer unit 203, HDD 209, compression/decompression unit 210, RAM 208, and the like are included.

A BOX function program 508 is a program for executing a BOX function which is executed by the controller unit 205 in accordance with an instruction from the operation unit 204 in the case where the user of the digital printer 102 instructed an execution of the BOX function through the operation unit 204.

In the BOX function, the digital printer 102 is controlled in such a manner that the controller unit 205 sequentially instructs the operations of the apparatuses in proper order on the basis of the processing order and processing conditions described in the program, so that the BOX process is executed. As such apparatuses, the scanner unit 201, printer unit 203, sheet processing apparatus 200, HDD 209, compression/decompression unit 210, RAM 208, and the like are included. The setting upon storage is changed for the stored job data and the BOX process can be executed.

A UI control program 509 is a program for controlling the operation unit 204 illustrated in FIG. 2. The UI control program 509 discriminates the contents which were input from the operation unit 204 by the user of the digital printer 102, instructs a shift to a proper display screen, and instructs a request for a process to the controller unit 205.

A sheet management program 510 is a program for executing a management function regarding the sheets which can be used by the digital printer 102. Sheet related information which is managed by this program is stored into the HDD 209 by the process of this program.

Other control programs 511 are programs for realizing functions which do not correspond to any of the foregoing programs and various kinds of operations are included therein. However, since their details are not important upon describing advantages of the embodiment, their description is omitted here. A free space 512 is provided.

In the various kinds of function programs shown in the diagram in the embodiment, there is no need to provide all of them and a construction having a part of those function programs or having function programs other than the programs mentioned above may be used. In any of those cases, the invention is effective.

FIG. 6 is a diagram illustrating a construction of the modules which are executed by the computer 101 illustrated in FIG. 1. This diagram relates to an example of various kinds of programs which have been stored in the HDD 311 in the computer 101 illustrated in FIG. 1 and are read out and executed by the CPU 301.

In FIG. 6, since the operations of a boot loader 601 and an operating system 602 are similar to those of the boot loader 501 and the operating system 502 of the printing apparatus in FIG. 5, their description is omitted here.

A device driver 603 is a program for controlling various kinds of hardware connected to the computer 101. A program for controlling the KBC 305, CRTC 306, DKC 307, and the like is also included.

A print application program 604 is a general denomination of the program which operates on the computer and is used to provide various kinds of functions and services to the POD system user. The print application program 604 has a function for forming or editing the print job data. The print application program 604 also has a function for converting from various kinds of print specifications set by a setting display screen (not shown) of such an application into a corresponding print setting. Further, the application can contrarily convert from a setting included in the print setting into internal information necessary to control items displayed on the setting display screen of the corresponding print application program 604.

Further, the print application program 604 also has a function for selecting a print setting file stored in the HDD 311 and forming print job data. The print application program 604 also has an ability for converting into a PDL command format or JDF format as the foregoing print setting, synthesizing with the print-target data, and forming the print job data.

A network control program 605 is a program which is executed when the print job data formed by the print application program 604 is transmitted to the digital printer 102 connected by the network 100.

The system can be also constructed in such a manner that the network control program 605 also has such functions that the print data is transmitted, after the transmission, progress information of the print job which is executed by the digital printer 102 connected to the computer 101 is obtained as a progress of the print process, and the like. Other programs 607 include a group of all programs which do not correspond to any of the foregoing programs and their detailed description is omitted.

Figure 7:
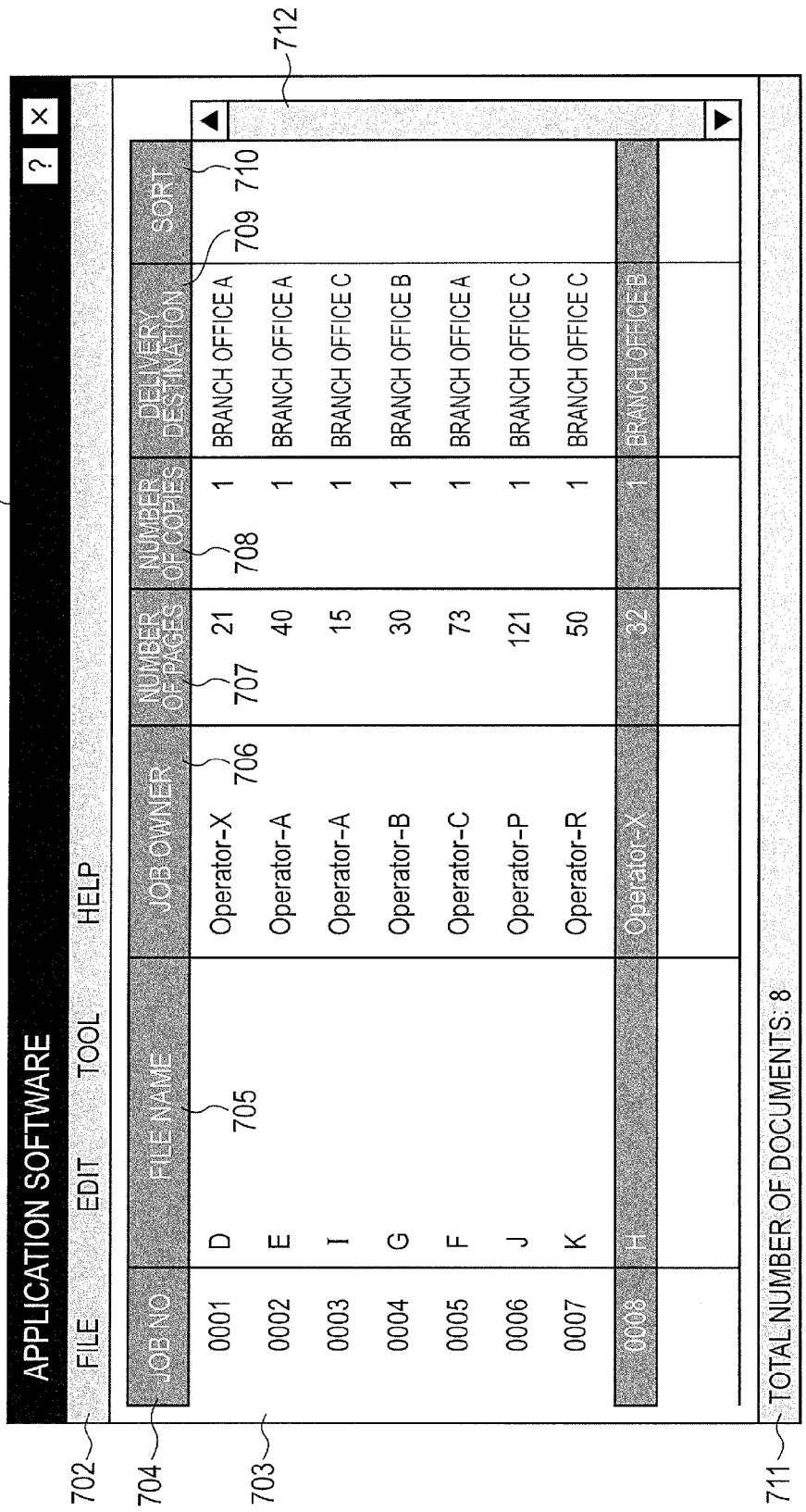
FIG. 7 is a diagram illustrating an example of a user interface which is displayed on a CRT illustrated in FIG. 3.

FIG. 7 is a diagram illustrating an example of a user interface which is displayed on the CRT 310 illustrated in FIG. 3. As for the print application program 604 illustrated in FIG. 6, this diagram illustrates an example of an application display screen 701 which is displayed on the CRT 310 under control by the CPU 301 in FIG. 3. Specifications of each unit displayed on the display screen of the relevant application and their associated functions will be described hereinbelow.

In FIG. 7, a menu bar 702 is a display portion for selecting various kinds of settings and functions held in the print application. The application in the embodiment is constructed so that further detailed items can be selected by a pull-down menu format. The menu bar 702 and a function of a pull-down menu which can be selected therefrom will be described hereinafter.

A list of the print-target data is shown in a display screen area 703. An area to show information and setting of each print-target data exists in an upper portion of the area 703. Specifically speaking, each information of a job number 704, a file name 705, a job owner 706, the number of pages 707, the number of copies 708, a delivery destination 709, and a sort 710 is separately displayed.

The job number 704 is ID information which is uniquely allocated in order in which the print-target data serving as print targets have been registered in the print application. Although the job number 704 is used when the print-target data is managed, since it is not essential in the description of the embodiment in the invention, its description is omitted.

The file name 705 is an area for displaying the file name of the print-target data serving as a print target. It is an object of the file name 705 to enable the user of the print application to easily discriminate the print-target data.

The job owner 706 is an area for displaying information regarding the user who has executed a registering process of the print-target data to the print application, that is, a print processing procedure. In the embodiment of the invention, there is shown an example of such a form of a job hold that the print-target data is temporarily registered by a plurality of users and the print processes are executed in a lump at subsequent timing.

Therefore, in consideration of a case where it is presumed that a plurality of users execute the registration of the print-target data at arbitrary timing, a display column of the print-target data is provided in order to improve a convenience for making the management of the registered print-target data easy.

Even in the case where the registration of the print-target data only by the one user is managed or the case where a plurality of operators exist, in a use case where there is no need to distinguish the operators, such a print application that the display column becomes unnecessary may be constructed.

The number of pages 707 is an area provided in order to display the number of print-target pages included in each print-target data registered in the print application. Information which is displayed here is constructed in such a manner that when the print-target data is registered, the information is obtained by analyzing the registered data by the function held in the print application.

The number of copies 708 is an area to display information regarding the number of copies in the print specification which is designated upon printing to each print-target data registered in the print application. A setting unit of the print specification at the time of registration of the print-target data will be described hereinafter.

The delivery destination 709 is an area to display information regarding the delivery destination of each print-target data registered in the print application. It is an object of the delivery destination 709 to allow this information to be used when a sorting process is executed by the delivery destination information at the subsequent print process. That is, as mentioned above, the print application accumulates a plurality of print-target data into the print application, converts into the print job data in a lump at subsequent timing, and prints. Control is made in such a manner that at the time of the print process of the print job data, the sorting process is executed on a unit basis based on the information shown in the column of the delivery destination 709.

In other words, the print-target data having the information of the same delivery destination is continuously printed and sorted as one bundle, thereby enabling the products after completion of the execution of the print process for each delivery destination serving as a sorting unit to be easily divided on a block unit basis.

The delivery destination 709 is information provided in order to use it when constructing the print job data for realizing the sorting process at that time. Since the sorting process is executed on a delivery destination unit basis upon printing, even in the case where a plurality of kinds of different print-target data were registered in the print application in any order, the block of the output matters can be easily separated every delivery destination. That is, such a problem that the erroneous delivery occurs due to the erroneous sorting performed by the operator can be solved.

In the embodiment, an example of the print application in the case where the delivery destination is presumed as a sorting unit has been shown. However, various kinds of sorting units other than the delivery destination can exist. Therefore, it is also possible to construct in such a manner that the information shown by the delivery destination 709 is replaced with information which denotes a unit based on another sorting object. In the embodiment, the information which can easily describe the advantage of solving the problem of the delivery destination has merely been shown for convenience of explanation.

The sort 710 is a field provided in order to set information for instructing the print application so that the sorting process is executed at the time of starting the printing of the corresponding page in the print job data corresponding to the print-target data in which the relevant column has been selected. The print application is constructed so as to form the setting information of the print job data so that the operation as mentioned above is executed.

A scroll bar 712 is used to make control for vertically shifting a display area in the case where the data cannot be fully displayed onto a job data list display screen of the print application illustrated in the diagram. The total number of documents 711 is an area to display the number of print-target data registered in the print application.

In the embodiment, an example of the print application is illustrated in FIG. 7. However, another construction having an equivalent function can be also used. It is not always necessary that some or all of the various kinds of information displayed in the diagram are held as application functions. That is, it is possible to use another construction so long as the print-target data has been managed together with the delivery destination information and the sorting setting can be made.

FIG. 8 is a diagram illustrating an example of a user interface which is displayed on the CRT 310 illustrated in FIG. 3. The diagram shows an example of the pull-down menu function which is displayed when an editing menu 801 in the menu bar 702 illustrated in FIG. 7 has been selected.

As illustrated in the diagram, although various kinds of functions can be selected from the pull-down menu of the editing menu 801, only principal functions will be described here.

A setting changing menu 802 is selected when the print setting of the job of the selected print-target data is changed. This example shows a state where a job 804, that is, a job of a job No. 0008 is selected and displayed in an inverted state. By selecting the setting changing menu 802 in this state, the print setting which has been made upon registration of such a job can be changed. In a sorting menu 803, a process for exchanging the order of the print-target data registered in the print application to the delivery order is executed by using the delivery destination 709 as a key.

A data adding menu 805 is a menu for adding the print-target data by the print application. The print-target data can be executed from a file selecting menu (not shown) which is displayed by the data adding menu 805. Or, it is also possible to construct in such a manner that a file is selected by a mouse or the like equipped for the computer 101 on which the print application operates and the file is added by performing a drag-and-drop or the like onto the print application display screen.

In the case where the print-target application is in a state as illustrated in FIG. 8, a state of a result obtained by selecting and executing the sorting menu 803 in delivery order is illustrated in FIG. 9.

FIG. 9 is a diagram illustrating an example of a user interface which is displayed on the CRT 310 illustrated in FIG. 3. In this example, it is confirmed that the order exchanging process of the print-target data has been performed in accordance with the setting of the delivery destination. That is, if the print process is executed in the state illustrated in FIG. 9, the print process is started from the top data on the job data list in FIG. 9. Therefore, this means that the print data is transmitted to the digital printer 102 every delivery destination 901 on a bundle unit basis and the print process is executed.

Figure 10:
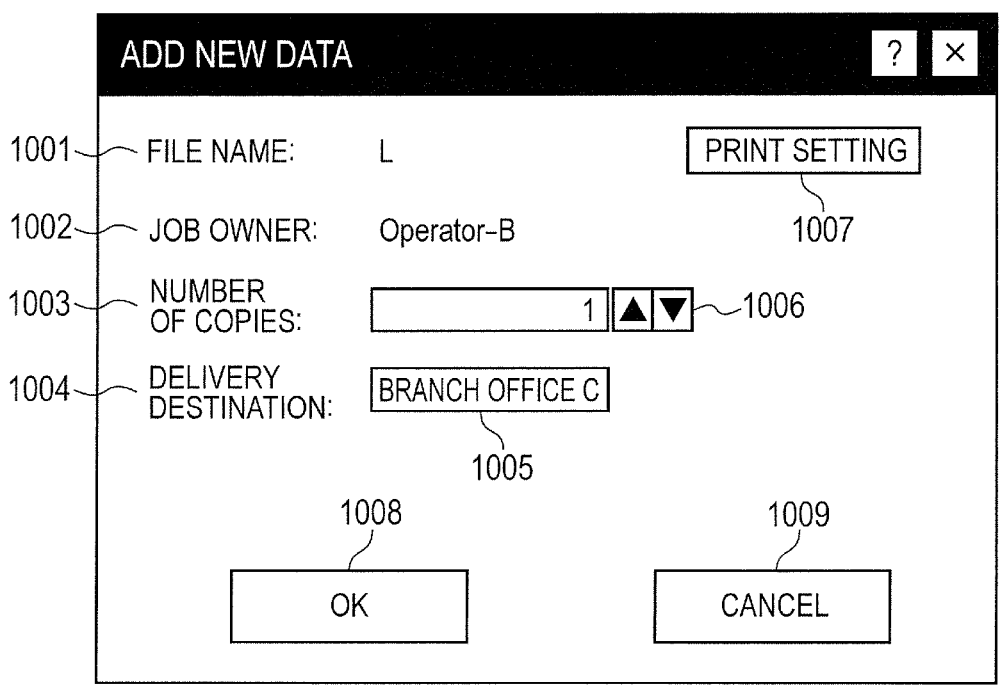
FIG. 10 is a diagram illustrating an example of a user interface which is displayed on the CRT illustrated in FIG. 3.

FIG. 10 is a diagram illustrating an example of a user interface which is displayed on the CRT 310 illustrated in FIG. 3. The diagram shows an example of a display screen in the case where in a state where the display of the screen of the print application is in a state of FIG. 9, the data adding process has been executed by the operation such as selection of the data adding menu 805 illustrated in FIG. 8, drag-and-drop mentioned above, or the like.

As illustrated in FIG. 10, a state where a file name 1001 of the print data serving as an addition target and a job owner 1002 who performed the adding process of the print data have automatically been input is shown. The print application is constructed so that the number of copies 1003 can be set when the print-target data has been registered. Specifically speaking, the number of copies can be changed by an increase/decrease button 1006 of the number of copies.

A delivery destination 1004 is an input column for registering the information which is displayed in the delivery destination 709 field in FIG. 7. In the example in the embodiment, a state where the branch office C has been input to a delivery destination column 1005 is shown.

As a method of inputting into the delivery destination column 1005, the following various kinds of methods are considered: that is, it is directly input by the KB in FIG. 3; it is selected from the pre-registered delivery destinations by a pull-down menu (not shown in the diagram); and the like. Since an input unit of the delivery destination information into the delivery destination column 1005 is not an essential condition of the invention, in FIG. 10, it is shown as an example of the specification in which it is directly input by the KB 309.

According to such a method, arbitrary delivery destination information can be input and there is such a possibility that the operator who executed the registering process of the print-target data inputs a wrong character train or the like when the delivery destination information is input. However, since the registering process of the delivery destination is preliminarily unnecessary and an arbitrary delivery destination can be registered, there is such an advantage that a flexibility upon application is high. Therefore, it is impossible to easily discriminate which method is more excellent.

Consequently, the input unit of the information into the delivery destination column 1005 is not a principal element of the invention. Even if any method is selected, the invention is effective.

A print setting button 1007 is a button to display a setting display screen regarding the setting of the print specification when the print data serving as a registration target is print-processed. As a print specification which can be set, it is constructed in such a manner that various kinds of conditions which can be designated in the print process which is supported by the digital printer 102 illustrated in FIG. 1 can be designated in accordance with necessity.

However, since the contents themselves of the print setting which can be designated by the setting display screen are not essential when describing the advantages of the invention, their detailed description is omitted.

By pressing an OK button 1008, the print data is registered into the print application illustrated in FIG. 7. That is, it is added to the print-target data.

When a cancel button 1009 is pressed, the print-target data is not registered but the display screen is shifted to the state of the display screen of FIG. 9. In this case, the various kinds of setting contents which were set in the diagram are also cancelled.

FIG. 11 is a diagram illustrating an example of a user interface which is displayed on the CRT 310 illustrated in FIG. 3. This diagram shows an example of a state of the display screen of the print application just after the OK button 1008 was pressed by the data adding display screen illustrated in FIG. 10.

As illustrated in FIG. 11, it is confirmed that the print-target data to which the adding process was executed in FIG. 10 has been added to a portion shown by a job number 1101. In the total number of documents 1102, it is also confirmed that the added data has been reflected.

FIG. 12 is a diagram illustrating an example of a user interface which is displayed on the CRT 310 illustrated in FIG. 3. This diagram shows an example of a state of the display screen after the setting of the sorting processing was performed in the state of the display screen illustrated in FIG. 11 in the print-target application.

In FIG. 12, a state where checkmarks 1201 and 1202 have been added is confirmed. This state corresponds to such a process that the setting of the print specification is instructed in such a manner that the print job data is constructed so that, at portions where the checkmarks 1201 and 1202 have been added, the sorting process is executed at the time of the print process of the page of the print data registered in the print application.

As illustrated in FIG. 12, the sorting process is instructed to the print-target data corresponding to the boundary between the branch offices A and B and to the print-target data corresponding to the boundary between the branch offices B and C. By setting as mentioned above, when the print application transmits the print job data to the digital printer 102 and executes the print process, the sorting process is executed at the time of starting the printing of the output matters for the branch offices B and C.

Although the check marks for sorting in FIG. 12 have been made on the assumption that the process is executed by the pointing device such as a mouse or the like (not shown) equipped for the computer 101 illustrated in FIG. 3, naturally, it is also possible to construct so that they are selected by another unit.

FIG. 13 is a diagram illustrating an example of a user interface which is displayed on the CRT 310 illustrated in FIG. 3. This diagram shows an example of an instructing unit at the time when the registered print-target data is converted into the print job data and, thereafter, it is transmitted to the digital printer 102 and the print process is executed by the print application.

When the print start is instructed by the print application, it is constructed in such a manner that it is executed by a print menu 1302 which can be selected by a file menu 1301 in the menu bar 702 in FIG. 7.

Figure 14:
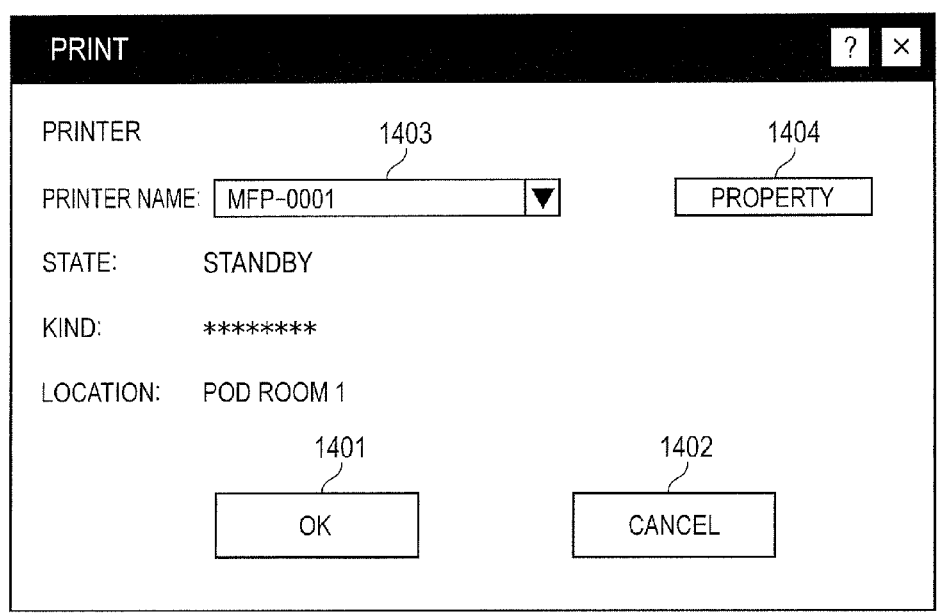
FIG. 14 is a diagram illustrating an example of a user interface which is displayed on the CRT illustrated in FIG. 3.

FIG. 14 is a diagram illustrating an example of a user interface which is displayed on the CRT 310 illustrated in FIG. 3. This diagram shows an example of a print display screen for instructing the print start which is displayed after the print menu 1302 illustrated in FIG. 13 was selected. Although the various kinds of information are disclosed, only important portions will be described hereinbelow.

In FIG. 14, a print name 1403 is provided in order to select the digital printer 102 which is used upon printing. Such a function is provided on the assumption that in the case where a plurality of digital printers 102 are connected via the network 100 to the computer 101 in which the print application operates, it is used when designating the specific digital printer 102. It is constructed in such a manner that a plurality of digital printers 102 can be selected from the pre-registered printers by the pull-down menu.

A property 1404 is provided in order to display a display screen for setting various kinds of print specifications which are performed when the print-target data registered in the print application is converted into the print job data and for setting the specification regarding an operation instruction to the digital printer 102. Although there are various kinds of items of the print specification which can be designated here, in the embodiment of the invention, the settings of the print specifications other than the sorting process are not important in the description of the advantages.

With respect to the setting of the sorting process, the print application is constructed in such a manner that it can be designated in the sort 710 field illustrated in FIG. 7 instead of the property 1404. The print application has been set in a state illustrated in FIG. 13. Therefore, the detailed description of the print specification setting display screen which is displayed by pressing the property 1404 is omitted here.

By pressing an OK button 1401, the print process by the print specification is started. Control is made in such a manner that by pressing a cancel button 1402, the instruction of the print process is stopped and the display screen is shifted to the display screen corresponding to FIG. 12.

Figure 15:
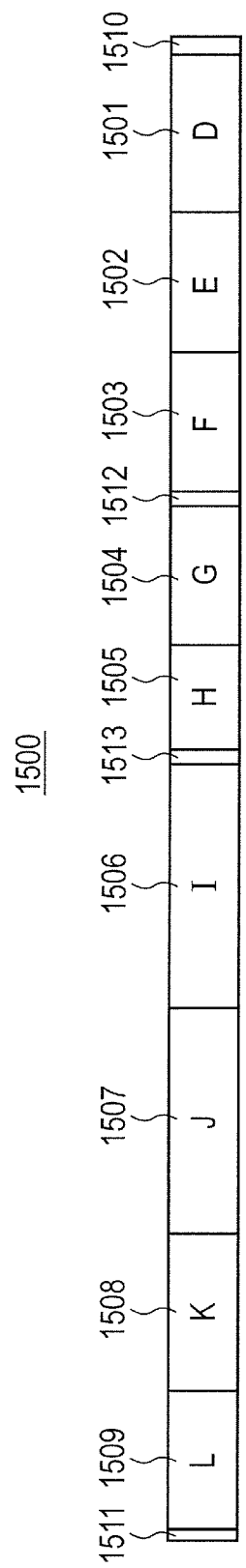
FIG. 15 is a diagram for describing a construction of print job data which is handled in the printing apparatus.

FIG. 15 is a diagram for describing a construction of the print job data which is handled in the printing apparatus showing the embodiment. This diagram shows an example of a construction of the print job data which is formed after the OK button in FIG. 14 was pressed when the print-target data registered in the print application is in a state of FIG. 13.

In the embodiment, a case where whole print job data 1500 is constructed as single PDL stream data is shown as an example. That is, in the print application, the print-target data is individually registered and managed as illustrated in FIG. 7 and subsequent drawings. However, control is made in such a manner that when the print process has been instructed and executed, each of those print-target data is converted into PDL data and single data in which the PDL data corresponding to the respective print-target data are coupled is constructed.

This is because it is caused since the print application uses a data forming method which is often used in a POD (Print On Demand) use case called a transaction job. The transaction job is a method suitable for another use case such as VDP (Variable Data Print) or the like where a large quantity of pages are continuously transmitted to the printer and sequentially processed.

In FIG. 15, the right side of the stream data in the diagram corresponds to a head position of the data and the left side corresponds to an end of the data. In order to clarify a correlation with the print-target data before the conversion in the stream data serving as continuous PDL job data, a file name of the print-target data serving as original data in the diagram is disclosed in correspondence to the diagram.

That is, print-target data 1501, 1502, 1503, 1504, 1505, 1506, 1507, 1508, and 1509 of respective file names correspond to them.

It is an important point that the arranging order of the print-target data serving as original data in the stream data coincides with the order of the print-target data registered in the print application illustrated in FIG. 12. That is, the print-target data is controlled in such a manner that the PDL stream data illustrated in FIG. 15 is formed in accordance with the order of the print-target data illustrated in FIG. 12.

In FIG. 15, data different from the PDL data corresponding to each of the foregoing print-target data is included in the PDL stream data.

A header 1510 is called a header and is data which is added in accordance with necessity in the case of executing a pre-process, an initializing process, or the like when the digital printer executes the print process. If those processes are unnecessary, the header 1510 can be also omitted. A process which needs the header 1510 and a process which does not need the header 1510 exist in accordance with the type of PDL data which is used. An example which presumes a case where the header 1510 is necessary is shown in the diagram. However, since the contents of instruction information disclosed in the header 1510 are not important in the case of describing the advantages of the embodiment of the invention, their description is omitted.

A setting having an object similar to that of the header is stored into an area 1511. The area 1511 differs from the header 1510 with respect to a point that it is an object to execute a post-process. If the area 1511 is unnecessary, it can be omitted in a manner similar to the header 1510. However, in FIG. 15, an example which presumes a case where this information is necessary is shown.

However, since the contents of instruction information disclosed in this area are not important in the case of describing the advantages of the embodiment of the invention, their description is omitted.

Sorting process commands 1512 and 1513 are provided. Positions where those sorting commands have been inserted into the stream data are important. That is, a position between F (1503) and G (1504) and a position between H (1505) and I (1506) correspond to such positions. In other words, it is confirmed that the sorting commands have been inserted so as to coincide with the positions of the sorting unit of each delivery destination illustrated in FIG. 12.

The print application constructs the stream data in such a manner that when the digital printer 102 has received the print job data 1500, at the position where the sorting command has been inserted, the sorting process is executed by a sorting apparatus equipped for a sheet ejecting mechanism of the digital printer 102.

Figure 16:
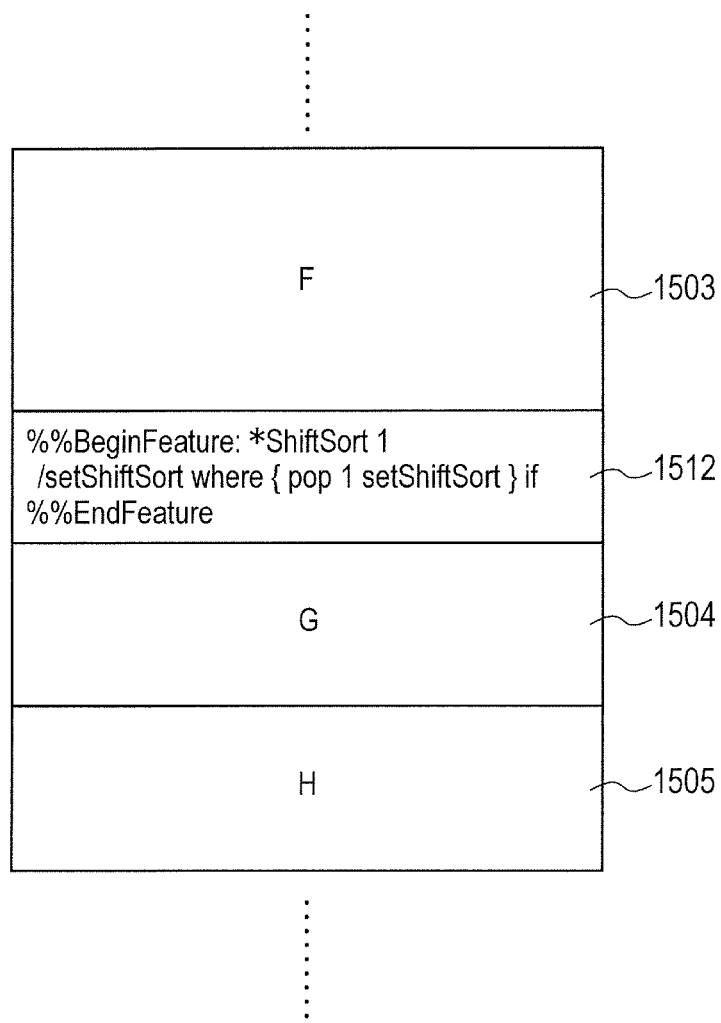
FIG. 16 is a diagram illustrating a detailed construction of a sorting command in FIG. 15.

FIG. 16 is a diagram illustrating a detailed construction of the sorting command 1512 in FIG. 15.

In FIG. 16, an upper portion indicates a head direction of the stream data and a lower portion indicates an end direction.

The data is illustrated by paying an attention to the portions of the PDL data F (1503), G (1504), and H (1505) converted by the function of the print application from the digital printer. Portions before and after those portions are omitted in the diagram.

A state where the sorting command 1512 has been inserted between F (1503) and G (1504) in FIG. 16 is illustrated. Although an example of the sorting command is illustrated in the diagram, it is merely shown as an example. Actually, it depends on the type of PDL data and the specification of the sorting command which can be interpreted and processed by the digital printer 102.

While the process is executed from the head of the stream data received by the PDL print function program 507, the digital printer 102 recognizes and interprets each sorting command (refer to FIG. 15) including the sorting command illustrated in FIG. 16. At this stage, the system is constructed so as to control in such a manner that the digital printer 102 executes the instructed sorting process. Details of the sorting process in the digital printer 102 will be described hereinafter.

Figure 17:
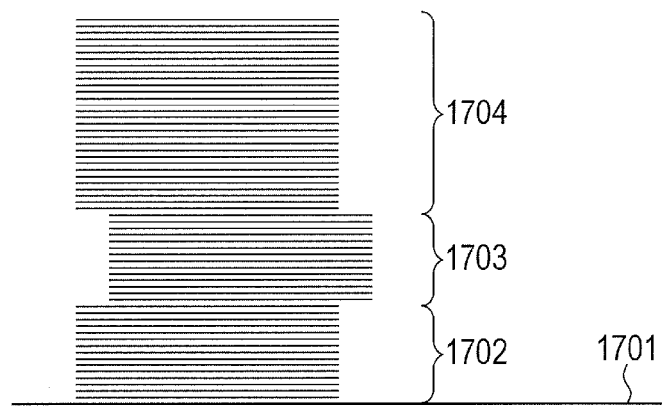
FIG. 17 is a diagram for describing a state of a sheet ejecting apparatus of a digital printer.

FIG. 17 is a diagram for describing a state of the sheet ejecting apparatus of the digital printer after the print job data transmitted by the print application to the digital printer 102 illustrated in FIGS. 15 and 16 was received and the print process and the sorting process were executed.

In FIG. 17, a delivery tray 1701 corresponds to one of normal delivery trays equipped for the stackers 225 and 226 of the large capacity or the saddle stitch book binder 227 illustrated in FIG. 2.

As illustrated in FIG. 17, it is confirmed from the diagram that a plurality of output sheets have been stacked on the delivery tray 1701 in a sorted state. The sorting process in the embodiment in the invention is illustrated with respect to the case of a shift sheet ejection as an example.

An output sheet bundle 1702 corresponds to output matters by the print-target data D, E, and F whose delivery destination is the branch office A. An output sheet bundle 1703 corresponds to output matters by the print-target data G and H whose delivery destination is the branch office B. Similarly, an output sheet bundle 1704 corresponds to output matters by the print-target data I, J, K, and L whose delivery destination is the branch office C.

Since the output sheets have eventually been stacked and shift sheet ejected (sorting process) for every designated delivery destination and stacked to the sheet ejecting apparatus of the digital printer 102 as mentioned above, the sorting operation for each delivery destination can be easily performed. Consequently, an effect of reducing a burden on the operator is obtained and an effect of decreasing a risk of erroneous delivery due to a mistake upon sorting is also obtained.

In addition to a method whereby an arranging position of the sheet bundle (output sheet bundle) is changed on the same sorting apparatus and the sheets are ejected, the controller unit 205 can use a sheet ejecting method whereby a distinction is clarified as follows.

Desirably, the controller unit 205 uses a method whereby a plurality of sorting apparatuses are allocated to the delivery destination and the sheet bundle (output sheet bundle) is ejected, a method whereby distinction sheets are inserted into the sheet bundle which is ejected to the same position by the same sorting apparatus and the sheet bundle is ejected, or the like.

Figure 18:
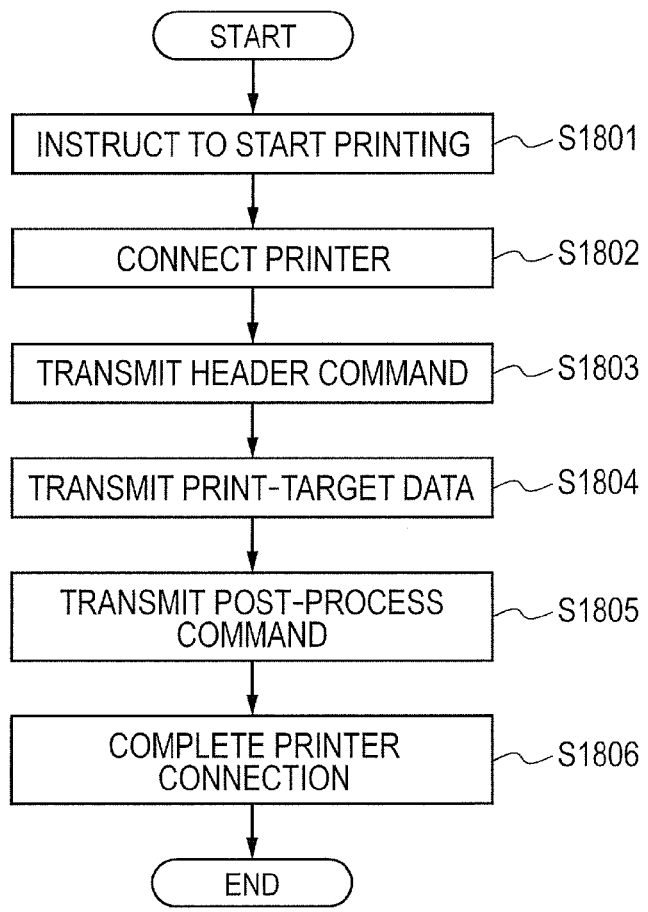
FIG. 18 is a flowchart for describing a data processing method of an information processing apparatus.

FIG. 18 is a flowchart for describing a control method of the information processing apparatus showing the embodiment. This diagram shows an example of the print process. Each processing step is realized by executing the print application program 604 which is executed by the CPU 301 in the computer 101.

The print process by the print application program 604 in the computer 101 is started at timing when the print menu 1302 shown in FIG. 13 has been selected (S1801).

Subsequently, the processing routine advances to S1802 and the CPU 301 establishes the connection with the digital printer 102 connected via the network 100 which is used in the print process. Specifically speaking, the connection between the NC 312 provided for the computer 101 and the external I/F unit 202 provided for the digital printer 102 is established, thereby making a preparation of the data transmission.

In S1803, the computer 101 transmits a header command to the digital printer 102 through the connection between the computer 101 and the digital printer 102 established by the execution of S1802.

Information which is transmitted to the digital printer 102 in S1803 is information corresponding to a head portion of the stream data which is expressed by the header 1510 illustrated in FIG. 15.

Subsequently, in S1804, the CPU 301 transmits the print-target data to the digital printer 102. Information which is transmitted in S1804 corresponds to information expressed by the following reference numerals in the example of FIG. 15: that is, 1501, 1502, 1503, 1512, 1504, 1505, 1513, 1506, 1507, 1508, and 1509. Details of the process in S1804 will be described hereinafter.

After completion of the process in S1804, S1805 follows and the CPU 301 in the computer 101 transmits information expressed by the area 1511 in FIG. 15 to the digital printer 102. Information which is transmitted in S1805 is information corresponding to an end portion of the stream data which is expressed by the header 1510 illustrated in FIG. 15.

Finally, in S1806, the CPU 301 disconnects the connection (finishes the connection) established between the CPU 301 and the digital printer 102 in S1802 and the print process if finished.

Figure 19:
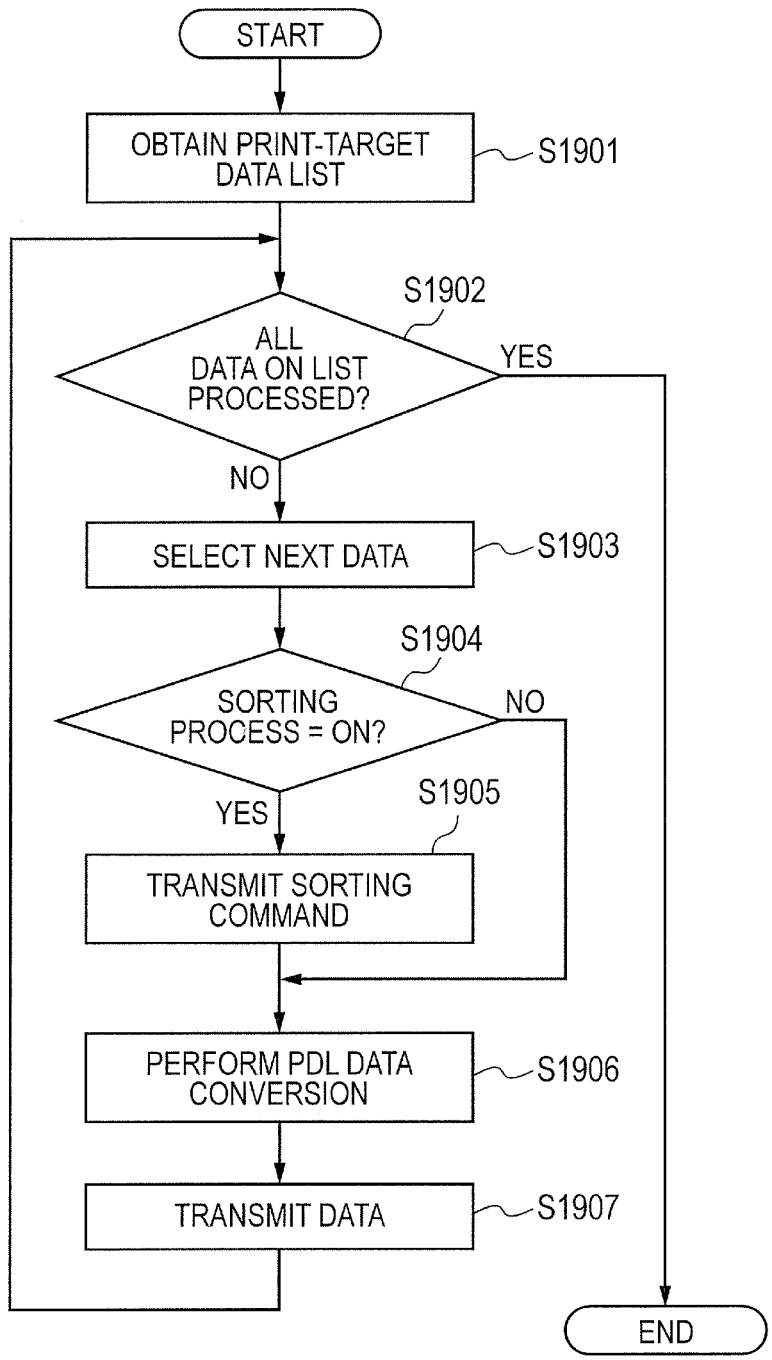
FIG. 19 is a flowchart for describing the data processing method of the information processing apparatus.

FIG. 19 is a flowchart for describing the control method of the information processing apparatus showing the embodiment. This flowchart relates to an example of the process of S1804 shown in FIG. 18, that is, a detailed example of the print-target data transmitting process. Each processing step is realized by executing the print application program 604 which is executed by the CPU 301 in the computer 101 in a manner similar to the flowchart shown in FIG. 18.

First, the CPU 301 obtains a list of the print-target data (S1901). The process of S1901 corresponds to a process for obtaining a list formed in such a manner that the print-target data displayed on the job list 703 registered in the print application is arranged in displaying order. That is, the print application executes the process for converting the print-target data into the print job data in the order obtained in S1901. For this purpose, the list obtained in S1901 is used. Processes in S1902 and subsequent steps are executed with respect to each element on the list obtained in S1901.

In S1902, the CPU 301 discriminates whether or not the forming and transmitting processes of the print data have been executed with respect to all of the print-target data included in the list obtained in S1901. If the CPU 301 determines here that those processes have been executed with respect to all of the print-target data included in the obtained list, this means that the processes were finished with respect to all data. Therefore, the processes shown in the flowchart are finished.

On the other hand, if the CPU 301 determines in S1902 that those processes are not yet executed with respect to all of the print-target data included in the obtained list, this means that the print-target data to which the processes are not yet completed remain. In this case, the processing routine advances to S1903 in order to continuously execute the processes.

In S1903, the data which is not yet processed is selected and obtained from the list obtained in S1901 in accordance with the order of the list.

Subsequently, in S1904, the CPU 301 discriminates whether or not the sorting process has been set for the print-target data obtained in S1903. The sorting process is set as shown in FIG. 12.

If the CPU 301 determines here that the sorting process has been set for the obtained print-target data, the CPU 301 transmits a command to execute the sorting process from the computer 101 to the digital printer 102 (S1905).

If the CPU 301 determines in S1904 that the sorting process is not set for the obtained print-target data, since there is no need to transmit the sorting command, the process of S1905 is skipped and S1906 follows.

In S1906, the CPU 301 executes a process for converting the print-target data selected in S1903 into the print job data. A type of PDL data which is converted in S1906 is an arbitrary type. That is, the invention is effective even in the case where any command or data format has been selected.

Subsequently, in S1907, the CPU 301 executes a process for allowing the computer 101 to transmit the data which was formed and converted in S1906 to the digital printer 102. After completion of the transmitting process, the processing routine is returned to S1902 again.

A processing loop of S1902 to S1906 is repeatedly executed until the processes are completed with respect to all elements on the list obtained in S1901.

The converting process of the print job data in S1906 and the transmitting process in S1907 have been described as different steps in the flow shown in the diagram. However, those two steps may be processed in parallel. That is, it is desirable that the data whose conversion has been completed is successively transmitted as a stream while executing the converting process of the data. In this case, S1906 and S1907 are processed in parallel.

Figure 20:
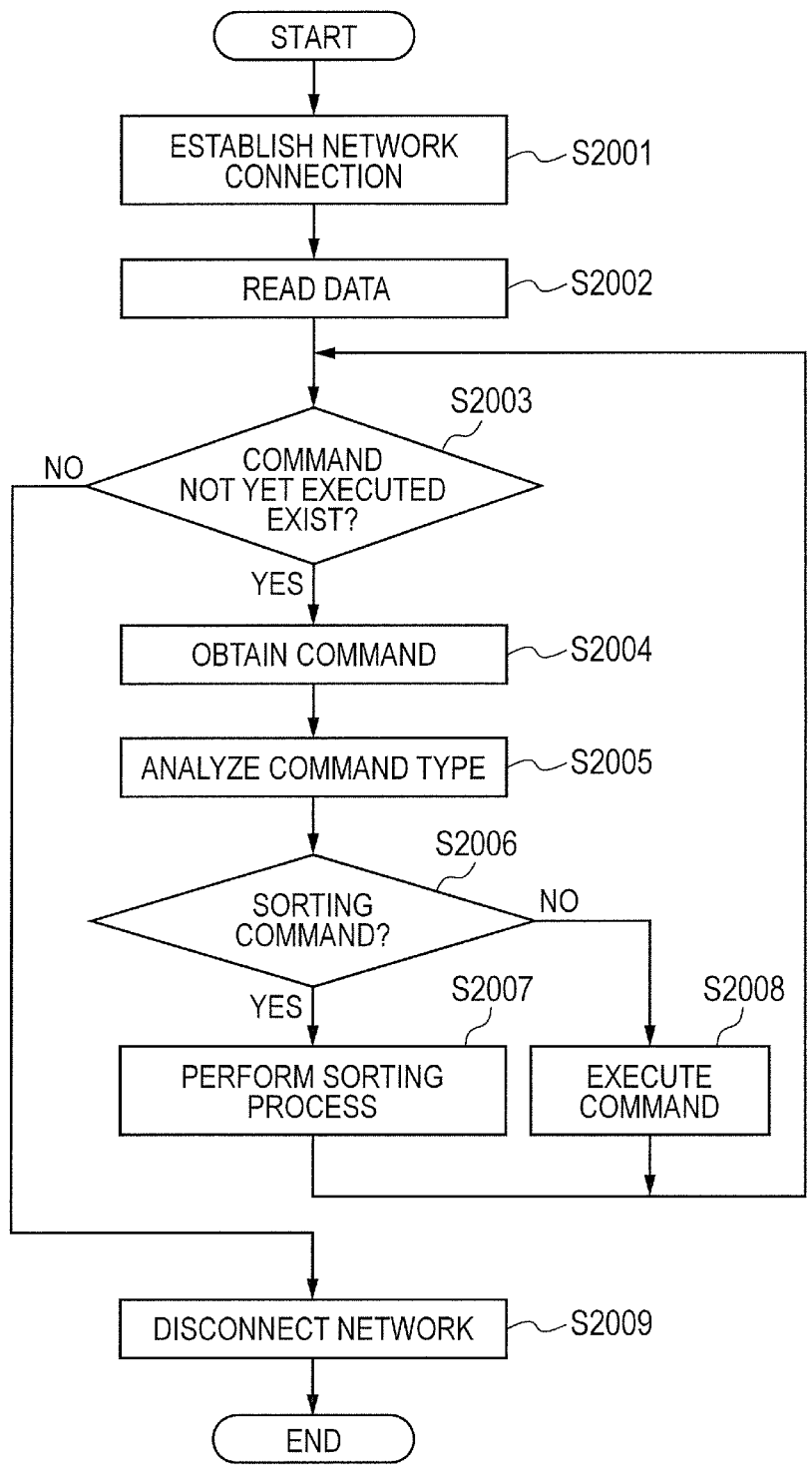
FIG. 20 is a flowchart for describing a control method of the printing apparatus.

FIG. 20 is a flowchart for describing a control method of the printing apparatus showing the embodiment. This diagram relates to an example of the print process of the print job data at the time when the digital printer 102 has received the print job data formed on the computer 101 shown in FIGS. 18 and 19. Each process in each step is realized by executing the PDL print function program which is executed by the controller unit 205 in the digital printer 102.

In S2001, the controller unit 205 receives a connecting request from the computer 101 connected via the network 100 and establishes the connection. The connecting request from the computer 101 corresponds to the process of S1801 shown in FIG. 18.

When the connection between the computer 101 and the digital printer 102 is established, S2002 follows and the controller unit 205 receives the print job data transmitted from the computer 101. The processes in S2003 and subsequent steps form a processing loop for repeating the processes with respect to all print job data which is received in S2002.

In S2003, the controller unit 205 discriminates whether or not the process-target data which is transmitted via the connection, that is, the data which is not yet processed (command which is not yet executed) in the print job data exists.

If the controller unit 205 determines here that the data which is not yet processed exists, it is decided that the process-target data remains. Processes in S2004 and subsequent steps are executed.

On the other hand, if the controller unit 205 determines that the data which is not yet processed does not exist, it is decided that the processes have been completed with respect to all print job data. The processing routine advances to S2009 and the connection established between the computer 101 and the digital printer 102 is disconnected and the print process is completed.

The print job data is constructed by: a drawing command; a control command for designating a post-process or the like of the printer; and data serving as a process target by those commands. A description will be made hereinbelow on the assumption that they are uniformly expressed as commands. That is, the print job data can be expressed by different words of "a set of commands".

Subsequently, in S2004, the controller unit 205 obtains a next process-target command from the stream which forms the print job data serving as a print process target. In S2005, the controller unit 205 executes an analyzing process of the obtained command.

Subsequently, in S2006, the controller unit 205 discriminates whether or not the type of the process-target command is the sorting command as a result of the analysis in S2005.

If the controller unit 205 determines that the process-target command type is the sorting command, S2007 follows, and the designated sorting process is executed. Details of the sorting process which is executed in S2007 indicate the sorting by the shifting process shown in FIG. 17 in the embodiment of the invention. That is, the controller unit 205 controls in such a manner that the sheet ejecting position is shifted to a sheet ejecting position different from the sheet ejecting position of the output matters ejected just before and the output matters are ejected to such a shifted position. A shift amount of the sheet ejecting position may be set to 5 mm or 10 mm and it is sufficient that it may be set to any position where the user can recognize a distinction position between the output matters by visual inspection. The user may preliminarily set a shift amount and the controller unit 205 may executes the software sheet ejecting process in accordance with the set shift amount.

That is, the execution of the sorting process in S2007 corresponds to such a process that the controller unit 205 transmits a command to change so as to shift the sheet ejecting position to the sheet ejecting apparatus in the sheet processing apparatus 200 and the sheet ejecting apparatus executes such a command. Details of the command which is transmitted from the controller unit 205 to the sheet ejecting apparatus are omitted here.

After that, the sheet ejecting position of the sheet ejecting apparatus is not changed unless otherwise the digital printer receives and executes the shifting command again. In other words, at a point of time when the shifting command is subsequently received, the shifting process is executed again.

On the other hand, if the controller unit 205 determines that the process-target command type is not the sorting command, a command other than the sorting process decided by the controller unit 205 is executed (S2008). For example, on the basis of the print job data, the controller unit 205 allows the printer unit 203 to print the image onto the sheet and ejects the printed sheet.

After completion of S2007 or S2008, the processing routine is returned to S2002 and the controller unit 205 executes the process of the next command. The operation at the time of the print process in the digital printer 102 is executed in this manner.

As mentioned above, the controller unit 205 controls in such a manner that the output matters of arbitrary print-target data designated by the user are ejected in a state where they are shifted from the output matters which were ejected just before and controls in such a manner that the output matters of other print-target data are ejected in a state where they are shifted from the output matters which were ejected just before. Thus, a burden of sorting which documents are delivered to which delivery destination is reduced, the operator can correctly recognize the output sheet bundle which was sorted for every delivery destination, and the erroneous recognition of the delivery destination can be certainly prevented.

Second Embodiment

The first embodiment has been described above with respect to the use case of the transaction print, as an example, in which when the print job data is formed from the print-target data, the print application forms single print job data. That is, as illustrated in FIG. 15, the print job data is handled as a single stream, and the digital printer 102 executes the recognition and process as a single job. The second embodiment will be described with respect to an example in which the print application forms a print job instead of the transaction print, embeds the sorting command into header information of the print job, and sorts it.

Figure 21:
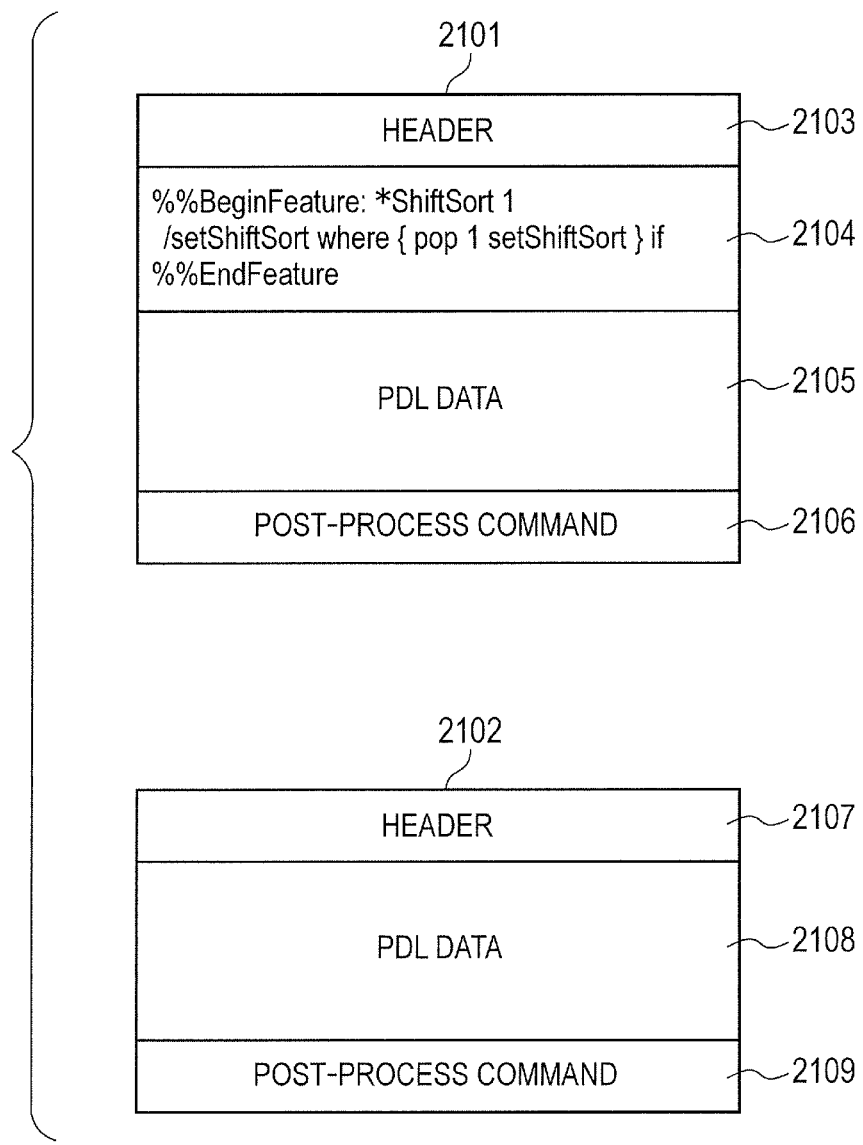
FIG. 21 is a diagram for describing a construction of print job data which is processed in the printing apparatus.

FIG. 21 is a diagram for describing a construction of the print job data which is processed in the printing apparatus showing the embodiment. This diagram is used to describe the construction of the print job data which is formed by the print application.

In FIG. 21, a print job header 2101 is constructed so as to include the sorting command. Print job data 2102 is an example in which the sorting command is not included.

With respect to both of the above cases, headers 2103 and 2107 which are added in accordance with necessity when executing a pre-process, an initializing process, or the like at the time when the digital printer executes the print process are included. They correspond to the header 1510 in FIG. 15.

Similarly, a print-target command and a PDL data portion (2105, 2108) serving as a data main body are included. They correspond to the portions 1501, 1502, 1503, 1504, 1505, 1506, 1507, 1508, and 1509 in FIG. 15.

Similarly, a post-process command (2106, 2109) is included. It corresponds to the data 1511 in FIG. 15.

A sorting command 2104 corresponds to the data 1512 shown in FIG. 15.

Figure 22:
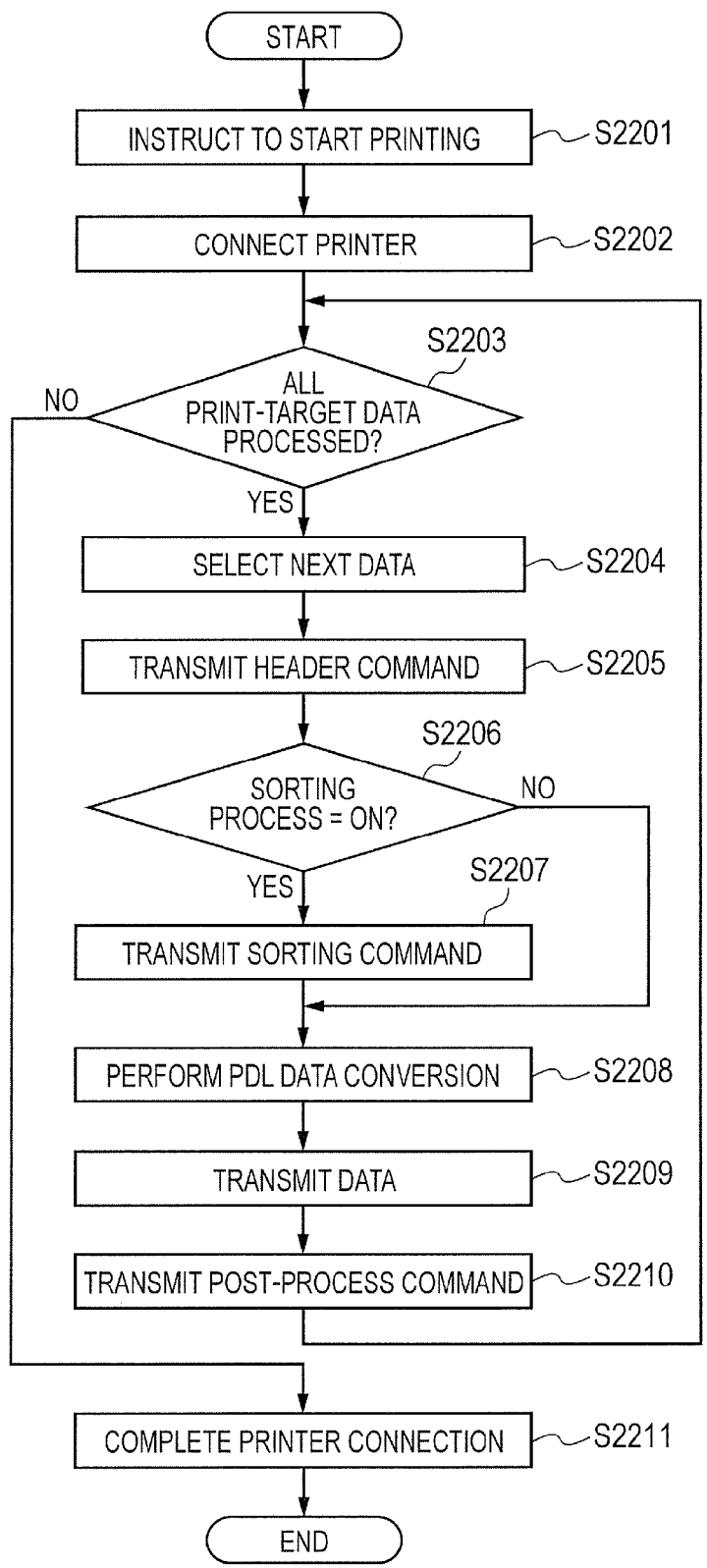
FIG. 22 is a flowchart for describing a data processing method in the information processing apparatus.

FIG. 22 is a flowchart for describing a data processing method in the information processing apparatus showing the embodiment. This flow relates to an example of a process which is executed when the print application program 604 is executed by the CPU 301 in the computer 101. In the following description, if the print application in the second embodiment has functions common to those shown in the first embodiment, the description will be made by partially citing the drawings in the first embodiment.

The print process which is executed by the print application program 604 is started at timing when the print menu 1302 illustrated in FIG. 13 has been selected (S2201).

Subsequently, in S2202, the CPU 301 establishes the connection to the digital printer 102 connected via the network 100 which is used in the print process. Specifically speaking, the connection between the NC 312 provided for the computer 101 and the external I/F unit 202 provided for the digital printer 102 is established, thereby making a preparation of the data transmission.

In S2203, the CPU 301 discriminates whether or not the data which is not yet transmitted in the print-target data exists. If the CPU 301 determines here that the data which is not yet transmitted in the print-target data does not exist, since this means that the processes have been completed with respect to all data, the processing routine advances to S2211. The connection established in S2202 is disconnected and the processes shown in the flowchart are completed.

On the other hand, if the CPU 301 determines in S2203 that the data which is not yet transmitted in the print-target data exists, this means that the print-target data whose process is not yet completed still remains. In such a case, in order to continuously execute the processes, the processing routine advances to S2204 and the print-target data serving as a next print process target is selected.

In S2205, through the connection between the computer 101 and the digital printer 102 established by the execution of S2202, the CPU 301 in the computer 101 transmits a header command to the digital printer 102. Information which is transmitted here is information expressed by the headers 2103 and 2107 illustrated in FIG. 21.

Subsequently, in S2206, the CPU 301 discriminates whether or not the sorting process has been set for the print-target data obtained in S2204. The sorting process is set as shown in FIG. 12.

If the CPU 301 determines here that the sorting process has been set for the print-target data obtained in S2204, the CPU 301 transmits the sorting command 2104 to execute the sorting process from the computer 101 to the digital printer 102 (S2207).

If the CPU 301 determines in S2206 that the sorting process is not set for the print-target data obtained in S2204, since there is no need to transmit the sorting command, the process of S2207 is skipped and S2208 follows.

Subsequently, in S2208, the CPU 301 executes the process for converting the print-target data selected in S2204 into the print job data. A type of PDL data which is converted in S2208 is an arbitrary type. That is, the invention is effectively applied even in the case where any command or data format has been selected so long as the characteristic items shown in the embodiment are contained.

Subsequently, in S2209, the CPU 301 executes a process for transmitting the print job data formed and converted in S2208 to the digital printer 102. After completion of the transmitting process, the CPU 301 advances to S2210 and transmits the post-process command 2106 or 2109. The processing routine is returned to S2203 again.

Information which is transmitted here is information expressed by the post-process command 2106 or 2109 in FIG. 21. After completion of S2210, the CPU 301 returns to S2203 again.

The processes of S2203 to S2210 mentioned above construct a processing loop which is repeatedly executed until the processes regarding all of the print-target data serving as targets which are transmitted by the print application according to the invention are completed.

Since the processes on the digital printer 102 side which receives the data formed by the flowchart shown in FIG. 22 and executes the printing and sorting process are similar to those of the flowchart shown in FIG. 20 in the first embodiment in the invention, their description is omitted here.

As mentioned above, the controller unit 205 controls in such a manner that the output matters of an arbitrary print job designated by the user are ejected in a state where they are shifted from the output matters which were ejected just before and does not control in such a manner that the output matters of other print jobs are ejected in a state where they are shifted from the output matters which were ejected just before.

Thus, a burden of sorting which documents are delivered to which delivery destination is reduced, the operator can correctly recognize the output sheet bundle which was sorted for every delivery destination, and the erroneous recognition of the delivery destination can be certainly prevented.

Third Embodiment

The first and second embodiments have been described with respect to the case of such a construction that in the print application shown as an example, the sorting process is executed in the sort field 710 in the display screen of the print application in FIG. 7 and subsequent drawings. In this case, since the sorting process can be designated at a designated arbitrary position, for example, even if the delivery destination is identical, the sorting process can be designated in order to further purposely divide the output matter bundle of the same delivery destination into blocks, or the like.

However, there is also a possibility that the user who uses the print application designates the sorting process to a wrong position due to an erroneous setting of the sorting process.

In the embodiment, an example of the print application by another sorting method which presumed the foregoing case is shown.

FIG. 23 is a diagram illustrating an example of a user interface which is displayed on the CRT 310 illustrated in FIG. 3. This diagram relates to an example of an operation display screen of the print application. As compared with the display screen illustrated in FIG. 7 in the embodiment, it is confirmed that the sort field 710 is omitted.

Figure 24:
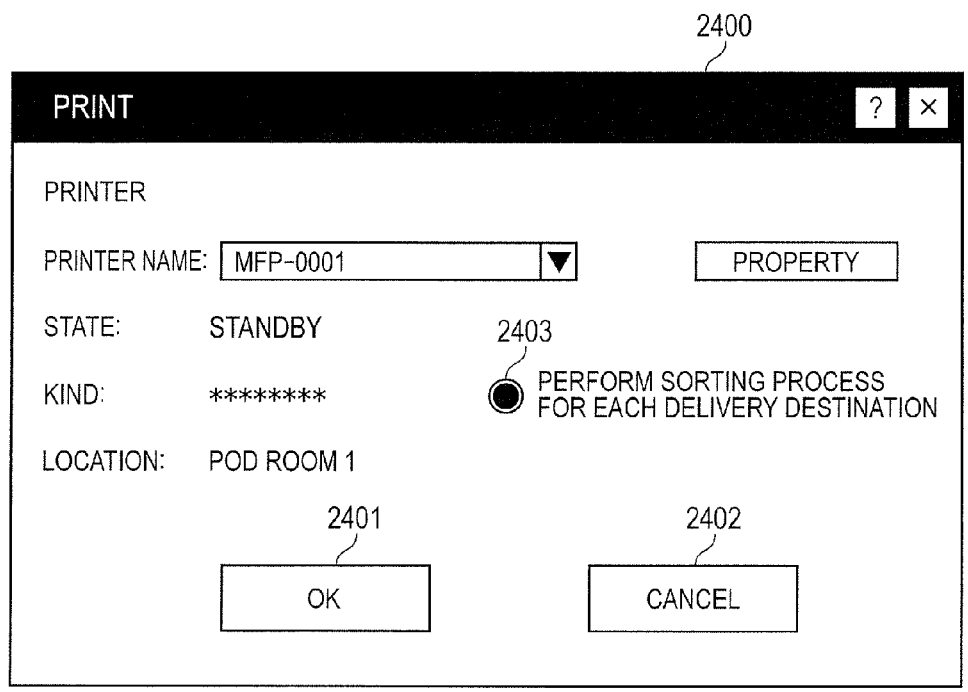
FIG. 24 is a diagram illustrating an example of a user interface which is displayed on the CRT illustrated in FIG. 3.

FIG. 24 is a diagram showing an example of a user interface which is displayed on the CRT 310 illustrated in FIG. 3. This diagram relates to an example of a print designation display screen of the print application illustrated in FIG. 23.

The UI display screen illustrated in FIG. 24 is displayed on the CRT 310 after a menu corresponding to the print menu 1302 illustrated in FIG. 13 was selected by the print application illustrated in FIG. 23. Although the various kinds of information are disclosed, only important portions will be described hereinbelow.

In FIG. 24, when a button 2403 is selected, this means that the print job has given the setting for sorting and outputting the print-target data for each delivery destination to the print application. When an OK button 2401 is pressed in a state where the button 2403 has been selected, the print-target data registered in the print application is collected every delivery destination, the sorting process is executed at a boundary of the output matters between the delivery destinations is executed, and the output matter bundle is output.

FIG. 25 is a flowchart for describing the data processing method in the information processing apparatus showing the embodiment. This flow relates to an example of processes at the time of printing of the print application program 604 which is executed by the CPU 301 in the computer. In the following description, if the print application in the third embodiment of the invention has functions common to those on the drawings illustrated in the first embodiment, a description will be made by citing a part of the drawings in the first embodiment.

The print process by the print application program 604 is started at timing when the print menu 1302 shown in FIG. 13 has been selected (S2501).

Subsequently, S2502 follows and the CPU 301 establishes the connection between the CPU 301 and the digital printer 102 connected via the network 100 which is used in the print process. Specifically speaking, the connection between the NC 312 provided for the computer 101 and the external I/F unit 202 provided for the digital printer 102 is established, thereby making a preparation of the data transmission.

In S2503, the CPU 301 obtains a list of the information of the delivery destinations serving as sorting targets. The information of the delivery destinations is such information which has given the order to a set of unique elements including information disclosed in a delivery destination field 2301 in the display screen of the print application illustrated in FIG. 23. The order may be order of sorting a character train. In a print application which can give the order for each delivery destination, it is also possible to use such a construction as to sort on the basis of the designated order.

In S2504, the CPU 301 discriminates whether or not the processes have been completed to all of the delivery destinations included in the delivery destination list obtained in S2503.

If the CPU 301 determines here that the processes have been completed to all of the delivery destinations included in the delivery destination list, since this means that the processes have been finished with respect to all of the delivery destinations, the processing routine advances to S2513 and the connection established in S2502 is disconnected. The present processing routine is finished.

If the CPU 301 determines in S2504 that the processes are not completed to all of the delivery destinations included in the delivery destination list, this means that the print-target data which is not yet processed remains. In this case, therefore, in order to continuously execute the process, the processing routine advances to processes of S2505 and subsequent steps.

In S2505, the CPU 301 selects the delivery destination information which is not yet processed from the delivery destination list obtained in S2503.

Subsequently, in S2506, the CPU 301 transmits the sorting command to the digital printer 102.

An object to transmit the sorting command in S2506 is as follows. That is, in S2507 and subsequent steps, the print process of a plurality of print-target data included in the same delivery destination is executed. At a stage where all of the processes of the print-target data corresponding to the selected delivery destination have been completed in S2505, the processing routine is returned to S2504 again. A processing loop for processing the printing of the print-target data corresponding to the further next delivery destination on the delivery destination list obtained in S2503 is formed.

That is, by certainly transmitting the sorting command to the digital printer 102 prior to starting the print process of the print-target data corresponding to a certain delivery destination, an outputting process in the state where the output matters have been sorted for every delivery destination as illustrated in FIG. 17 can be eventually performed.

In S2507, the CPU 301 discriminates whether or not the print process has been completed with respect to all of the print-target data corresponding to the delivery destination selected in S2505.

If the CPU 301 determines here that the print process has been completed with respect to all of the print-target data corresponding to the selected delivery destination, this means that the processes have been completed with respect to all of the print-target data corresponding to the delivery destination selected in S2505. Therefore, in order to execute the process of the print-target data corresponding to the next delivery destination, the processing routine is returned to S2504 again.

On the other hand, if the CPU 301 determines here that the print process is not completed yet with respect to all of the print-target data corresponding to the selected delivery destination, S2508 follows. The next print-target data in the print-target data corresponding to the delivery destination selected in S2505 is selected.

In S2509, the CPU 301 in the computer 101 transmits the header command to the digital printer 102 through the connection between the computer 101 and the digital printer 102 established by the execution of S2502. Since a description about the information which is transmitted to the computer 101 has already been made in the foregoing embodiment, its description is omitted here. The process of S2509 is performed by executing the print application program 604 by the CPU 301 in the computer 101.

Subsequently, in S2510, the CPU 301 executes a process for converting the print-target data selected in S2508 into the print job data. A type of PDL data which is converted is an arbitrary type. That is, the invention is effective even in the case where any command or data format has been selected.

Subsequently, in S2511, the CPU 301 executes a process for allowing the computer 101 to transmit the data which was formed and converted in S2510 to the digital printer 102. After completion of the transmitting process, the processing routine advances to S2512 and the CPU 301 transmits a post-process command. Since a description about the information which is transmitted has already been made in the foregoing embodiment, it is omitted here.

As mentioned above, after completion of S2512, the CPU 301 returns to S2507 again and repeats a processing loop for executing the processes of the next print-target data. The process of S2512 is performed by executing the print application program 604 by the CPU 301 in the computer 101.

Thus, even if the user does not manually set the position where the output matters are shifted and ejected, the output matters are ejected for every delivery destination in a state where they are shifted from the output matters which were ejected just before. Therefore, the user can easily distinguish the output matters for every delivery destination and can easily selectively pick up them.

Other Embodiments

Each of the foregoing embodiments has been described as an example with respect to the system using the PDL data as a print specification. As an expressing form of the print specification, the job can be also designated by a predetermined job ticket such as JDF or the like. In this case, the print specification has such a feature that it can be easily separated and synthesized from/with the print job data which was converted and formed from the print-target data.

For example, if the print application program 604 according to the invention has an ability of forming the print specification including the sorting command by a JDF format, the print job data can be executed by a JDF function program of the digital printer 102.

In the description of the foregoing embodiment, the sorting process has been shown as an example with respect to the case where it is executed by using the shift sheet ejecting function provided for the sheet ejecting apparatus. However, various kinds of functions other than the shift sheet ejecting function exist as a sorting process.

For example, such a sorting method that the ejection destination of the output sheets is changed on a sort unit basis is considered as a sorting process.

Further, such a method that insertion paper is inserted to the output sheets on a sort unit basis and a boundary portion between the output sheets of every sort is clarified or the like is also considered as a sorting process.

For example, if the stackers of the large capacity as illustrated in FIG. 2 have a function for opening an outer cover by an instruction from the controller unit 205, a method of sorting by a process for ejecting the products in the stackers of the large capacity at the sorting timing is also considered as a sorting process.

As mentioned above, even if any method is used as a type of sorting process, the invention is applied.

Further, it is also possible to construct in such a manner that a step corresponding to a notifying process for notifying a fact that the ejection of the sheet bundle becomes an error if the controller unit 205 determines that the system is not in a state where the sheet bundle can be ejected to each delivery destination is assembled into the corresponding embodiment.

Further, control may be made in such a manner that if the controller unit 205 determines that the system is not in a state where the sheet bundle can be ejected to each delivery destination during the ejection of the sheet bundle, the ejection of the sheet bundle is interrupted.

The functions shown in the diagrams in the embodiments may be executed by a host computer in accordance with a program which is installed from the outside. In such a case, the system is constructed in such a manner that data for displaying an operation display screen similar to the operation display screen including various kinds of operation display screens and mentioned in the embodiments is installed from the outside and various kinds of user interface display screens can be provided to the display portion of the host computer. In the case of such a construction, the invention is applied even in the case where an information group including a program is supplied to an outputting apparatus by a storage medium such as CD-ROM, flash memory, FD, or the like or from an external storage medium through the network.

The invention is not limited to the foregoing embodiments but various modifications (including an organic combination of the embodiments) are possible on the basis of the spirit of the invention, and they are not excluded from the scope of the invention. For example, the foregoing various kinds of setting display screens are displayed to the operation unit 204 of the digital printer 102 and the controller unit 205 may execute the printing and sorting process in accordance with the setting received through the displayed setting display screens. That is, it is sufficient to construct the controller unit 205 in such a manner that the output matters are shift-ejected at the timing instructed from the user and, in accordance with the setting, the output matters are shift-ejected at the timing instructed from the user. Although the controller unit 205 in the digital printer 102 is a main unit for making the foregoing various kinds of control in the embodiments, it is also possible to construct in such a manner that a part or all of the various kinds of control can be executed by an externally-attached controller or the like as a separate body different from the digital printer 102.

Aspects of the present invention can also be realized by a computer or a system or apparatus (or device such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2012-139822, filed on Jun. 21, 2012, which is hereby incorporated by reference herein in its entirety.

What is claimed is:
1. A printing apparatus comprising:
a printing unit configured to print an image onto a sheet by executing a print job comprised of first print data and second print data; and
a controller configured to obtain a predetermined information included in the print job and control the ejection of sheets on which images are printed by the printing unit in such a manner that, when the controller obtains the predetermined information which is associated with the first print data and the second print data, a second sheet on which an image is printed based on the second print data is ejected to a second position which is different from a first position of a first sheet on which an image is printed based on the first print data, wherein the controller controls the ejection of the sheets on which images are printed by the printing unit in such a manner that, when the controller does not obtain the predetermined information which is associated with the first print data and the second print data, the second sheet is ejected to the first position.

2. A control method for controlling a printing apparatus, comprising:
   printing an image onto a sheet by executing a print job comprised of first print data and second print data;
   obtaining a predetermined information included in the print job; and
   controlling ejection of sheets on which images are printed in such a manner that, when the predetermined information which is associated with the first print data and the second print data is obtained, a second sheet on which an image is printed based on the second print data is ejected to a second position which is different from a first position of a first sheet on which an image is printed based on the first print data,
   wherein the ejection of the sheets on which images are printed is controlled in such a manner that, when the predetermined information which is associated with the first print data and the second print data is not obtained, the second sheet is ejected to the first position.

3. A printing apparatus comprising:
   a printing unit configured to print an image onto a sheet by executing a print job comprised of first print data and second print data; and
   a controller configured to obtain a predetermined information included in the print job and configured to control ejection of sheets on which images are printed by the printing unit in such a manner that a second sheet on which an image is printed based on the second print data is ejected to a second position which is different from a first position of a first sheet on which an image is printed based on the first print data is ejected, when the controller obtains the predetermined information which is for executing sorting between the first sheet and the second sheet,
   wherein the controller controls the ejection of the sheets on which images are printed by the printing unit in such a manner that the second sheet is ejected to the first position when the controller does not obtain the predetermined information.

4. The printing apparatus according to claim 3, further comprising a receiving unit configured to receive data obtained by coupling the first print data and the second print data, as the print job.

5. A control method for controlling a printing apparatus, comprising:
   printing an image onto a sheet by executing a print job comprised of first print data and second print data;
   obtaining a predetermined information included in the print job; and
   controlling ejection of sheets on which images are printed in such a manner that a second sheet on which an image is printed based on the second print data is ejected to a second position which is different from a first position of a first sheet on which an image is printed based on the first print data is ejected, when the predetermined information which is for executing sorting between the first sheet and the second sheet is obtained,
   wherein the ejection of the sheets on which images are printed is controlled in such a manner that the second sheet is ejected to the first position when the predetermined information is not obtained.

6. The control method according to claim 5, further comprising receiving data obtained by coupling the first print data and the second print data, as the print job.

7. A printing apparatus comprising:
   a receiving unit configured to receive data obtained by coupling first print data and second print data, as a print job;
   a printing unit configured to print an image onto a sheet by executing the print job received by the receiving unit;
   a controller configured to detect a predetermined information included in the print job and control ejection of sheets on which images are printed by the printing unit in such a manner that a second sheet on which an image is printed based on the second print data is ejected to a second position which is different from a first position of a first sheet on which an image is printed based on the first print data is ejected, when the controller obtains the predetermined information which is for executing sorting between the first sheet and the second sheet.

8. The printing apparatus according to claim 7, wherein the controller controls the ejection of the sheets on which images are printed by the printing unit in such a manner that the second sheet is ejected to the first position when the controller does not obtain the predetermined information.

9. A control method for controlling a printing apparatus, comprising:
   receiving data obtained by coupling first print data and second print data, as a print job;
   printing an image onto a sheet by executing the received print job;
   obtaining a predetermined information included in the print job; and
   controlling ejection of sheets on which images are printed in such a manner that a second sheet on which an image is printed based on the second print data is ejected to a second position which is different from a first position of a first sheet on which an image is printed based on the first print data is ejected, when the predetermined information which is for executing sorting between the first sheet and the second sheet is obtained.

10. The control method according to claim 9, wherein the ejection of the sheets on which images are printed is controlled in such a manner that the second sheet is ejected to the first position when the predetermined information is not obtained.

* * * * *